(12) United States Patent
Hajimiri

(10) Patent No.: US 11,400,829 B1
(45) Date of Patent: Aug. 2, 2022

(54) METHODS AND SYSTEMS FOR BATTERY-VEHICLE INTERFACE SOLUTIONS FOR SUPPORTING USE OF SWAPPABLE BATTERIES IN ELECTRIC VEHICLES

(71) Applicant: Popion Mobility Inc., Burlingame, CA (US)

(72) Inventor: Hadi Hajimiri, Burlingame, CA (US)

( * ) Notice: Subject to any disclaimer, the term of this patent is extended or adjusted under 35 U.S.C. 154(b) by 0 days.

(21) Appl. No.: 17/374,377

(22) Filed: Jul. 13, 2021

(51) Int. Cl.
*B60L 53/80* (2019.01)
*B60L 53/30* (2019.01)
*B60L 58/26* (2019.01)
*B60L 58/27* (2019.01)

(52) U.S. Cl.
CPC .............. *B60L 53/80* (2019.02); *B60L 53/30* (2019.02); *B60L 58/26* (2019.02); *B60L 58/27* (2019.02)

(58) Field of Classification Search
None
See application file for complete search history.

(56) References Cited

U.S. PATENT DOCUMENTS

| | | | |
|---|---|---|---|
| 5,585,205 A | 12/1996 | Kohchi | |
| 8,454,377 B2 | 6/2013 | Heichal et al. | |
| 9,026,357 B2 | 5/2015 | Park et al. | |
| 9,488,493 B2 | 11/2016 | MacNeille et al. | |
| 9,694,707 B2 | 7/2017 | Shrinkle | |
| 9,834,183 B2 | 12/2017 | Moskowitz | |
| 9,868,421 B2 | 1/2018 | Hassounah | |
| 9,932,019 B2 | 4/2018 | Hassounah | |

(Continued)

FOREIGN PATENT DOCUMENTS

| | | |
|---|---|---|
| EP | 2644438 B1 | 10/2013 |
| EP | 3414122 A1 | 12/2018 |

(Continued)

OTHER PUBLICATIONS

Sun Mobility Bus Battery Swap Video; https://youtu.be/hWIAf6P61LE.

(Continued)

*Primary Examiner* — Jared Fureman
*Assistant Examiner* — Aqeel H Bukhari
(74) *Attorney, Agent, or Firm* — McAndrews, Held & Malloy, Ltd.

(57) ABSTRACT

Systems and methods are provided for battery-vehicle interface solutions for supporting use of swappable batteries in electric vehicles. A swappable battery may include a power delivery subsystem configured to deliver power to an electric vehicle when the swappable battery is coupled to the electric vehicle, and a power control circuit configure to control operation of the swappable battery. The electric vehicle may correspondingly include a power distribution subsystem configured to receive power from a swappable battery when the swappable battery is coupled to the electric vehicle, and a power control circuit configure to control use of the swappable battery when it is connected to the electric vehicle. The swappable battery may connect to the electric vehicle via a battery interface. The battery interface may include one or more connections for facilitating interactions between the swappable battery and the electric vehicle during operation of the swappable battery in the electric vehicle.

20 Claims, 15 Drawing Sheets

(56) References Cited

U.S. PATENT DOCUMENTS

| | | |
|---|---|---|
| 10,017,037 B2 | 7/2018 | Newman et al. |
| 10,300,801 B2 | 5/2019 | Gaffoglio et al. |
| 10,359,066 B2 | 7/2019 | Hassounah et al. |
| 10,710,633 B2 | 7/2020 | Carlson et al. |
| 2009/0082957 A1 | 3/2009 | Agassi et al. |
| 2010/0181129 A1* | 7/2010 | Hamidi .................. B60L 53/80 180/68.5 |
| 2015/0037647 A1* | 2/2015 | Nguyen ............ H01M 10/6555 429/120 |
| 2015/0134467 A1 | 5/2015 | Penilla et al. |
| 2015/0367743 A1 | 12/2015 | Lin et al. |
| 2016/0368464 A1 | 12/2016 | Hassounah |
| 2017/0141368 A1 | 5/2017 | Ricci |
| 2017/0283090 A1 | 10/2017 | Miller et al. |
| 2019/0012064 A1 | 1/2019 | Foerster et al. |
| 2019/0126775 A1 | 5/2019 | Han et al. |
| 2019/0359076 A1* | 11/2019 | Nakano ................... B60L 58/12 |
| 2020/0164760 A1* | 5/2020 | Sohmshetty ............ B60L 53/67 |
| 2020/0198494 A1 | 6/2020 | Chen et al. |
| 2020/0406780 A1 | 12/2020 | Hassounah |

FOREIGN PATENT DOCUMENTS

| | | |
|---|---|---|
| EP | 3725606 A1 | 10/2020 |
| WO | 2018009852 A1 | 1/2018 |

OTHER PUBLICATIONS

International Search Report and Written Opinion for PCT/US2022/026687, dated May 17, 2022, 8 pages.

* cited by examiner

METHODS AND SYSTEMS FOR BATTERY-VEHICLE INTERFACE SOLUTIONS FOR SUPPORTING USE OF SWAPPABLE BATTERIES IN ELECTRIC VEHICLES

CROSS-REFERENCE TO RELATED APPLICATIONS/INCORPORATION BY REFERENCE

This patent application makes reference to U.S. patent application Ser. No. 17/306,564, filed May 3, 2021, and U.S. patent application Ser. No. 17/325,515, filed May 20, 2021. Each of the above-identified applications is hereby incorporated herein by reference in its entirety.

BACKGROUND

Aspects of the present disclosure relate to energy solutions. More specifically, certain embodiments in accordance with the present disclosure relate to methods and systems for battery-vehicle interface solutions for supporting use of swappable batteries in electric vehicles.

Various issues may exist with conventional solutions for powering electric vehicles. In this regard, conventional systems and methods for powering electric vehicles, particularly using rechargeable batteries, may be costly, cumbersome, and/or inefficient.

Limitations and disadvantages of conventional systems and methods will become apparent to one of skill in the art, through comparison of such approaches with some aspects of the present methods and systems set forth in the remainder of this disclosure with reference to the drawings.

BRIEF SUMMARY

System and methods are provided for battery-vehicle interface solutions for supporting use of swappable batteries in electric vehicles, substantially as shown in and/or described in connection with at least one of the figures, as set forth more completely in the claims.

These and other advantages, aspects and novel features of the present disclosure, as well as details of one or more illustrated example embodiments thereof, will be more fully understood from the following description and drawings.

DETAILED DESCRIPTION

Figure 1:
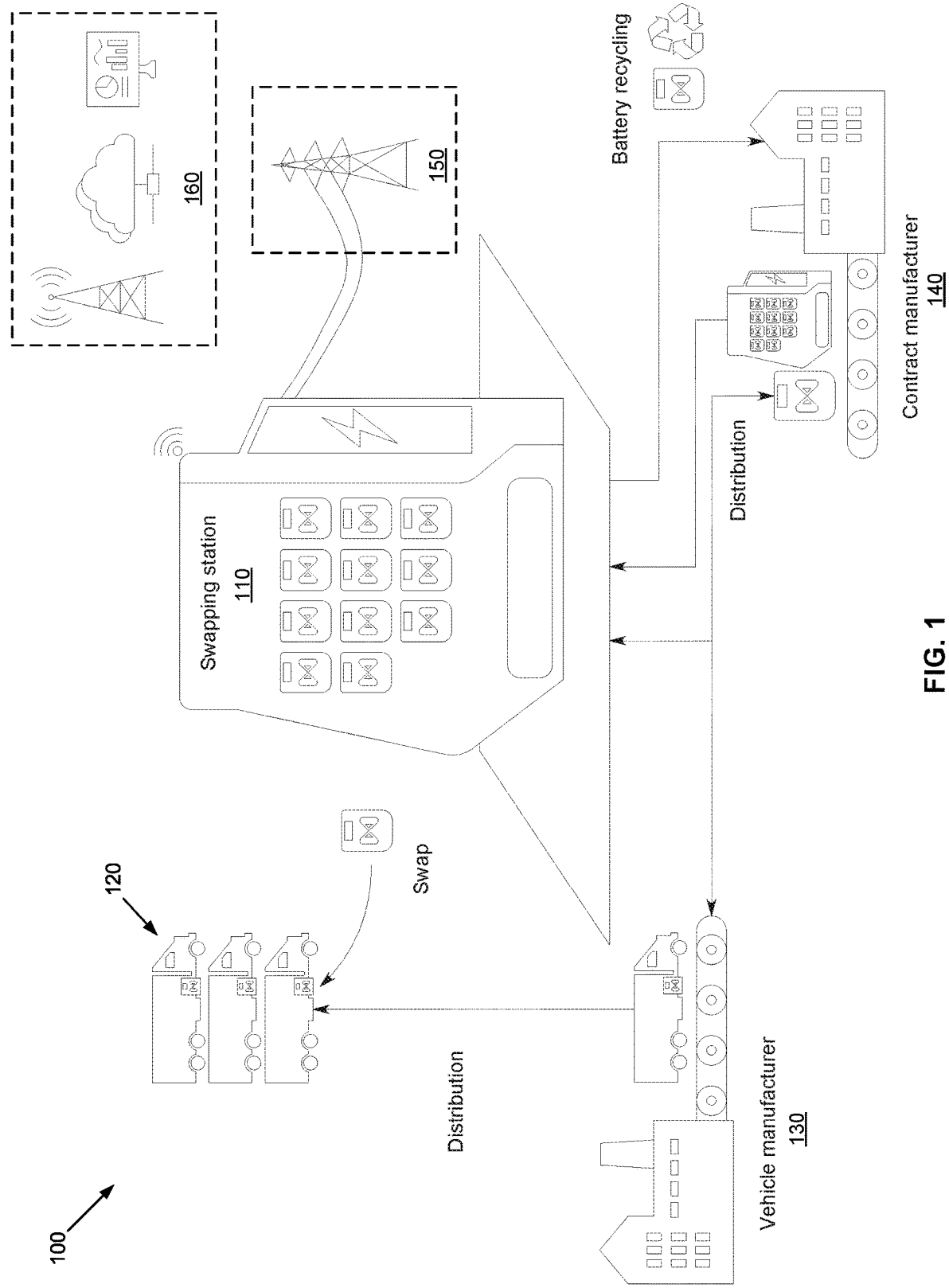
FIG. 1 illustrates an example end-to-end infrastructure for supporting use of swappable batteries in electric vehicles.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

As used in this disclosure, "vehicles" may comprise privately and/or publically owned and/or operated vehicles (e.g., individual user vehicles, vehicles of private fleets, vehicles of public fleets, etc.), and may comprise vehicles configured for transportation functions (e.g., people and/or cargo) as well as vehicles configured for various non-transportation functions (e.g., construction, mining, industrial, commercial, etc.). Further, as used in this disclosure, "vehicles" may be human-operated vehicles, autonomous vehicles, remote controlled vehicles, etc. Further, while many example implementations or examples are provided using ground-based vehicles, the disclosure is not so limited, and various features of the disclosure may apply in substantially similar manner to water-based and/or air-based vehicles (e.g., boats, airplanes, etc.). Examples of vehicles as used herein may comprise automobiles, buses, trucks, construction or mining vehicles (bulldozers, dump trucks, etc.), forklifts, boats, and the like.

As used in this disclosure, an electric vehicle comprises a vehicle that uses one or more electric motors (or other electric-based engine or system) for propulsion and/or use power drawn from swappable battery packs implemented in accordance with the present disclosures for functions other than propulsion. The electric propulsion may be used the exclusive mode of operation or may be used in conjunction with other modes/types (e.g., conventional internal combustion based systems). Various solutions may be used for providing the electrical power required for the electric propulsion systems of electric vehicles. Example solutions may comprise use of systems for collecting electricity from off-vehicle sources (e.g., solar panels, etc.), or use of self-contained systems, such as batteries, solar panels, fuel cells, etc. In some instances, an electric vehicle may also comprise a vehicle or other mobile equipment that draws power from swappable battery pack(s), implemented in accordance with the present disclosure, for use in conjunction with non-propulsion related functions. Examples of non-propulsion based use cases include transport refrigeration units (TRUs or reefers), remote radio towers, remote heating systems (e.g., for expedition camps), and the like.

FIG. 1 illustrates an example end-to-end infrastructure for supporting use of swappable batteries in electric vehicles. Show in FIG. 1 is infrastructure 100 that supports use of swappable batteries in electric vehicles.

The infrastructure 100 comprises a plurality of battery-swapping fueling stations 110 that may be configured for providing fueling services, particularly by use of battery-swapping, to electric vehicles 120. The infrastructure 100 may also comprise additional elements that may be used for supporting the battery-swapping fueling stations 110 and/or operations thereof. Such additional elements may comprise vehicle manufacturers 130, contract manufacturers 140, electrical grid (network) 150, cloud-based systems 160, etc.

The battery-swapping fueling stations 110 may comprise various components for facilitating and supporting the battery-swapping operations, as well as for supporting ancillary functions and services. While the battery-swapping fueling station 110 is illustrated as a fixed structure, the disclosure is not so limited, and as such in some instances battery-swapping fueling stations may be configured for mobility—that is, with at least some components of the battery-swapping fueling station being mobile, to enable (re-) deployment at different locations, etc. Battery-swapping fueling stations are described in more detail below.

The vehicle manufacturers 130 may comprise manufacturing resources associated with manufacturing of electric vehicles. This may include original manufacturers as well as after-market modification providers. The vehicle manufacturers 130 may provide vehicles configured for supporting use of swappable batteries. This may comprise building or configuring vehicles to use electric propulsion systems, to provide all or at least portion of the propulsion for operating the vehicles, with at least a portion of the required electrical power being provided by batteries deployed in the vehicles. In this regard, supporting use of swappable batteries may further comprise incorporating components for receiving and mating with the batteries—e.g., suitable battery housings, as described herein.

The contract manufacturers 140 may comprise manufacturing resources configured for manufacturing components or equipment used in conjunction with battery-swapping operations. The contract manufacturers 140 may be used in manufacturing the swappable batteries and/or components thereof, the battery-swapping fueling stations and/or components or equipment thereof, etc. In some instances, the contract manufacturers 140 may also support recycling and/or disposal operations, to allow for recycling or disposal of swappable batteries, components or equipment of battery-swapping fueling stations, etc.

The electrical grid (network) 150 may comprise an interconnected network configured for electricity delivery from producers to end-users (residential, commercial, industrial, etc.). While not shown in FIG. 1, the electrical grid 150 comprises in its entirety such elements as power generation components (e.g., power generation stations, solar or wind farms, etc.), electrical substations configured to manipulated voltage in conjunction with transmission operations (e.g., step voltage up), electric power transmission components configured for carrying power over long distances, electric power distribution components configured for distributing power to the end-users and manipulated voltage in conjunction with distribution operations (e.g., step voltage down again, such as based on predetermined required service voltages).

The cloud-based systems 160 may comprise cloud-based computing resources that may be configured for providing cloud-based management functions, particularly with respect to managing the batteries and battery-swapping fueling stations. The cloud-based systems 160 may be configured to provide, for example, cloud-based monitoring, control, and management, including, e.g., providing updated control data, modifying operations of battery-swapping fueling stations, providing network-wide dynamic information (status, availability, etc.) and the like. Such systems are described in more detail below.

In operation, the infrastructure 100 may be used in facilitating and supporting use of swappable batteries in conjunction with operating electric vehicles, and for optimizing such use of swappable batteries. In this regard, as noted above, electric vehicles use electric systems (e.g., motors) for providing at least a portion of the propulsion required for operating the vehicles. While various solutions may be used in providing the required electrical power, the most common approach is to use batteries (or other similar electrical storage/discharge components). Use of batteries may pose some challenges and/or may have some shortcomings, however.

For example, ranges and/or endurance may be relatively short when using electric propulsion based on (exclusively) batteries for power supply. Further, recharging batteries may be a lengthy process. While these conditions may be acceptable in some use scenarios (e.g., in private use of personal vehicles especially within urban areas, where users may not drive long distances, and may simply recharge the batteries overnight), such conditions may pose severe logistical and operational challenges in other use scenarios—e.g., in conjunction with commercial use, with large vehicles, for long distance and/or long duration operations, etc. Therefore, solutions that overcome such limitations in battery-based use scenario/implementations are desirable.

In accordance with the present disclosure, at least some of the limitations associated with use of batteries for electric propulsion in electric vehicles may be overcome, particularly by use of battery-swapping fueling stations configured for swapping batteries, and for doing so in optimal manner—e.g., quickly, efficiently, and cost-effective way. In this regard, rather requiring the electric vehicle remain inoperable or stationary while being recharged, the use of battery-swapping stations allows for swapping spent (or almost-spent) batteries in electric vehicles with fully (or almost fully) charged batteries from the stations. The swapped-out batteries may then be recharged in the stations and re-used when fully charged. Use of such battery-swapping stations may be particularly advantageous for larger electric vehicles and/or for operators of large fleets of such vehicles, who may be particularly interested in reducing down time and/or increasing range as much as possible.

In various implementations, the infrastructure 100 may incorporate and/or may operate based on billing/compensation model that applies to the various parties using or supporting the infrastructure. For example, users of the swapping stations may pay for the swapping of the batteries on a per-use basis, or may do so using a subscription-based service. In some instances, the infrastructure may be configured to account for "remaining charge" in the batteries, and thus the user may be given credit for requiring less than full recharge. In addition, the infrastructure may be configured to account for recycling cost, with at least some of the cost being passed to the users.

Relatedly, the infrastructure may incorporate support for user and/or device authentication. The user authentication may be built into the subscription-based service, for example. Further, device identification validation may be performed, to ensure that only approved batteries are used in the infrastructure. The infrastructure 100 may support or incorporate green technologies and/or practices. For example, disposal of batteries or other components may be done in environmental conscious manner, with components or equipment being recycled where possible.

In some implementations, performance may be optimized by incorporating into the electric vehicle resource for recharging the batteries—e.g., using regenerative capabilities in the electric vehicle, such as based on braking, or by use of other existing non-electric powertrain.

Figure 2:
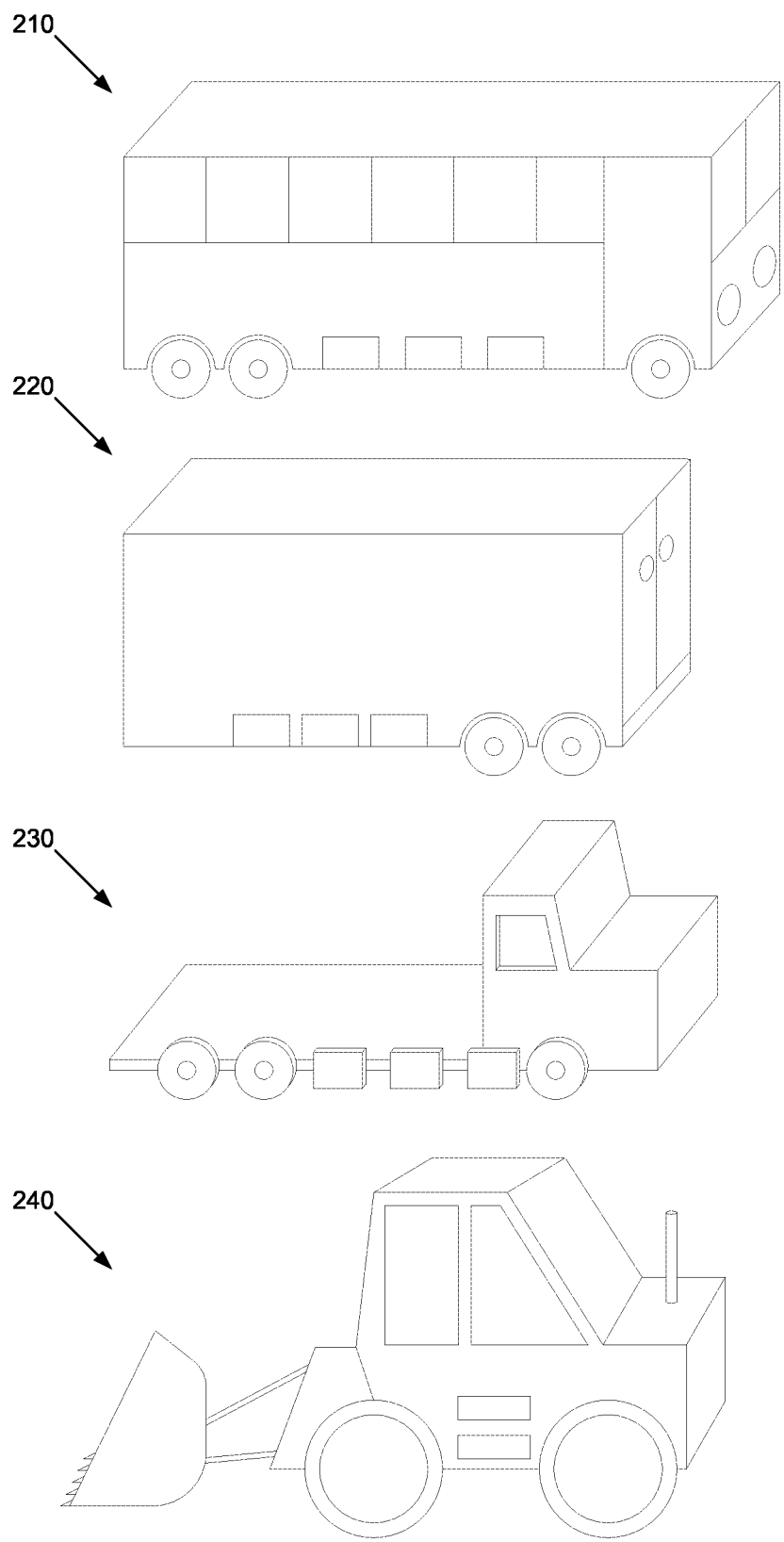
FIG. 2 illustrates example use of swappable batteries in various types of vehicles.

FIG. 2 illustrates example use of swappable batteries in various types of vehicles. Shown in FIG. 2 are various types of electric vehicles that may be configured for supporting and using battery-swapping based solutions, in accordance with the present disclosure.

In particular, illustrated in FIG. 2 are a bus 210, a truck 220, a trailer (e.g., reefer) 230, and a wheeled bulldozer 240. Each of these vehicles may be configured for operation as an electric vehicle, and particularly for supporting and using battery-swapping based solutions in conjunction with their operations as electric vehicles. As illustrated in FIG. 2, each of these electric vehicles may incorporate battery housing(s) for receiving swappable batteries, and for supporting use of these swappable batteries, particularly in conjunction with use of battery-swapping fueling stations that are configured for swapping these batteries as described herein.

In this regard, as described above, the battery housings used in receiving and mating with the swappable batteries may be designed and/or implemented to allow for versatility and adaptability of deployment, and to allow for ease of swapping, to optimize operation (e.g., by reducing complexity and/or time required for swapping the batteries). For example, the battery housings may be configured on one or more preset battery configurations (e.g., based on size, such as width, height and depth), support one or more predefined interfaces (e.g., predefined connections for mating the battery to the electric vehicle, predefined profiles and protocols for power delivery/transfer and/or communications via the connections, etc.). Also, the number and location of the battery housings used may be adaptively determined or set for different electric vehicles, such as based on anticipated power use, operation conditions (e.g., to avoid placing batteries where they are more likely be damaged), etc. Further, to enhance operation, the battery housing may be weather proofed (with or without door(s)). An example implementation of an electric truck is described in more detail with respect to FIG. 3A.

Figure 3A:
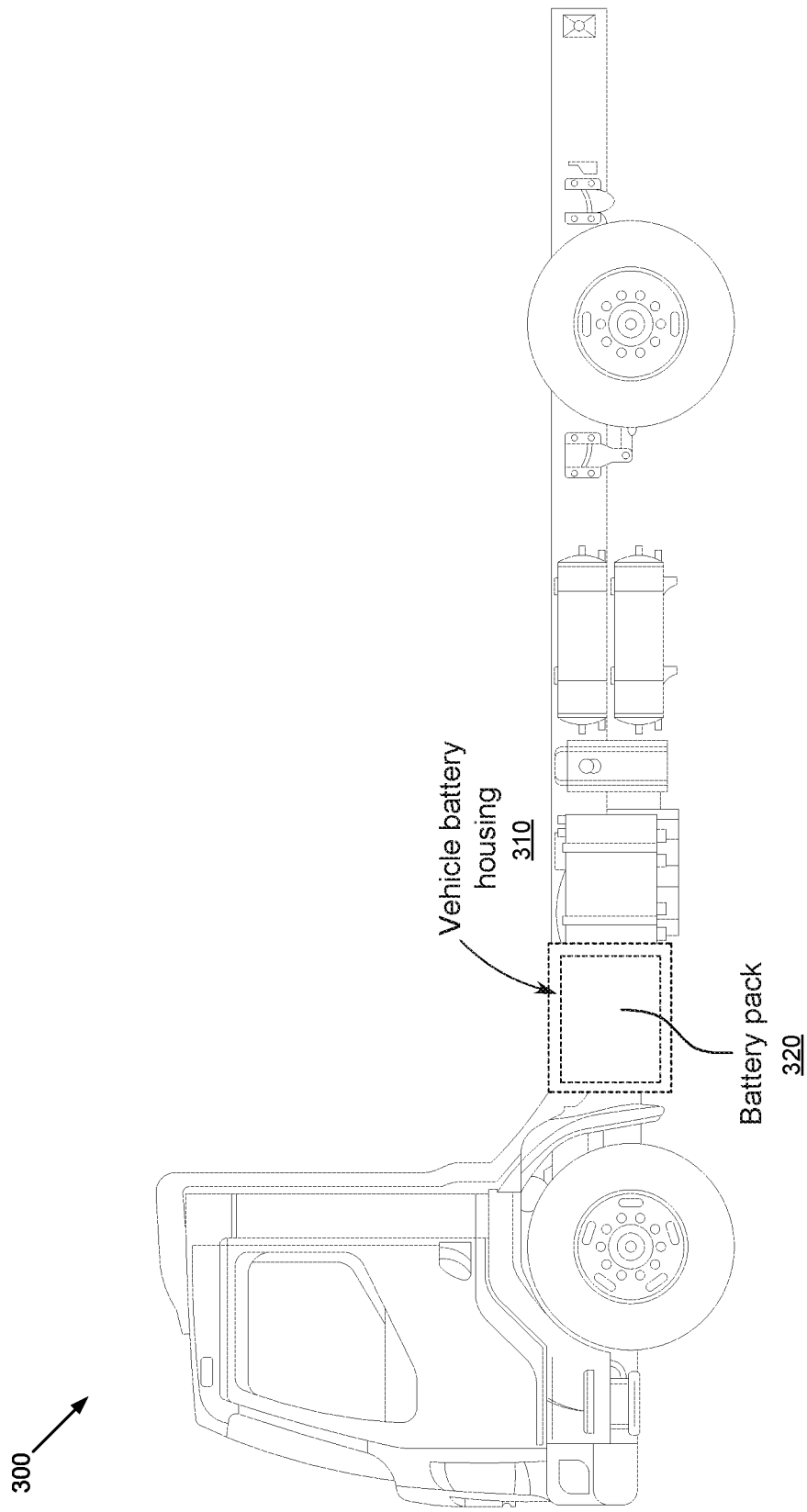
FIG. 3A illustrates an example use scenario for deploying swappable batteries in a truck.

FIG. 3A illustrates an example use scenario for deploying swappable batteries in a truck. Shown in FIG. 3A is a truck 300 that is configured for supporting and using battery-swapping based solutions, in accordance with the present disclosure.

The truck 300 may be configured for operation as an electric vehicle, and particularly for supporting and using battery-swapping based solutions as described in the present disclosure in conjunction with its operations as an electric vehicle. In this regard, the truck 300 may be configured for utilizing batteries that provide electricity to provide or facilitate at least some of the propulsion required for operation of the truck. Further, the truck 300 may incorporate battery housing(s) for receiving swappable batteries.

For example, as shown in FIG. 3A, the truck 300 may incorporate battery housing(s) 310 for receiving swappable batteries 320, and for supporting use of these batteries, particularly in conjunction with battery-swapping fueling stations that are configured for swapping these batteries as described herein. In this regard, as noted above, the number and location of the battery housings used in electric vehicles may be adaptively determined or set based on the electric vehicle (or type thereof).

Therefore, to facilitate use of swappable batteries in trucks (e.g., the truck 300), truck specific mounting may be used. In this regard, battery housings may be installed in, for example, the same location used for traditional fuel tanks, as illustrated in FIG. 3A, with the battery housings mounted on the side (e.g., using saddle mount on the truck's frame rails). The use of battery housings, particularly with respect to deployment (e.g., insertion) of swappable batteries therein is described in more detail with respect to FIGS. 3B, 4A and 4B.

Figure 3B:
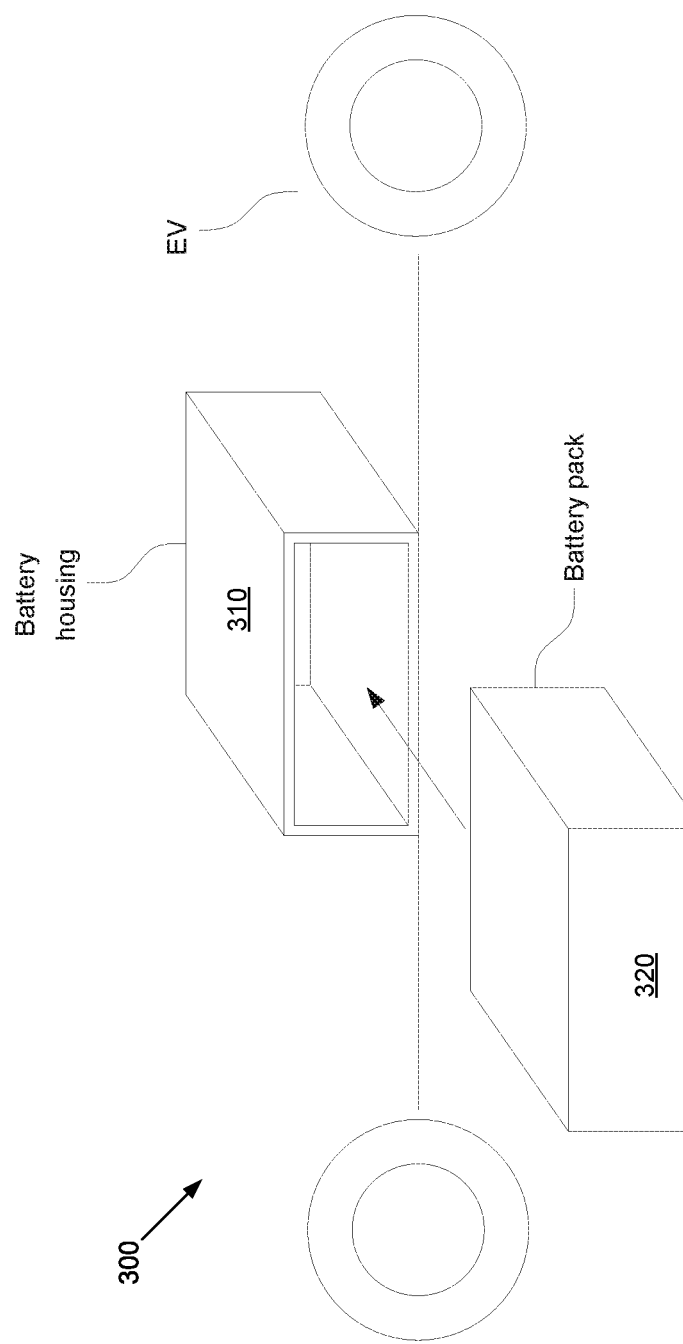
FIG. 3B illustrates an example use of swappable batteries in an electric vehicle.

FIG. 3B illustrates an example use of swappable batteries in an electric vehicle. Shown in FIG. 3B is an example use scenario for inserting a swappable battery into an electric vehicle (e.g., the truck 300 for FIG. 3A) that is configured for supporting and using battery-swapping based solutions.

As illustrated in FIG. 3B, a swappable battery (e.g., the swappable battery 320 of FIG. 3A) may be inserted into a corresponding battery housing (e.g., the battery housing 310 of FIG. 3A) in the electric vehicle. In this regard, in various implementations in accordance with the present disclosure, batteries may be configured to fit into corresponding housing (in the vehicle, such as the battery housing 310, and/or within battery-swapping fueling stations, such via corresponding charger housings implemented therein) in a drawer-like slide motion, as shown in FIG. 3B. Use of such drawer-like slide may be advantageous, as it would greatly enhance the speed and ease of swapping operation. However, while FIG. 3B illustrates use of a single swappable battery—that is, one-to-one correspondence between the swappable battery and the battery housing—the disclosure is not so limited. Rather, in some implementations, multiple batteries may be deployed in (e.g., inserted into) a single battery housing. This is described in more detail with respect to FIGS. 4A and 4B.

Figure 4A:
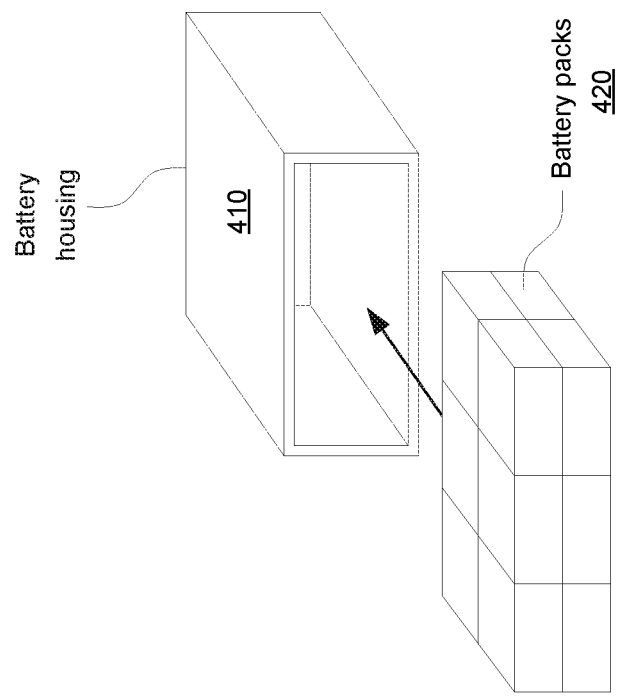
FIG. 4A illustrates an example use of multiple swappable batteries in an electric vehicle.

FIG. 4A illustrates an example use of multiple swappable batteries in an electric vehicle. Shown in FIG. 4A is an example use scenario for deploying (e.g., inserting at a battery-swapping fueling station) a plurality of swappable batteries (or battery packs) 420 in an electric vehicle (not shown) that is configured for supporting and using battery-swapping based solutions. In this regard, the electric vehicle may incorporate battery housing(s) 410 for receiving swappable batteries, and for supporting use of these batteries, particularly in conjunction with battery-swapping fueling stations that are configured for swapping these batteries as described herein.

As illustrated in the example use scenario shown in FIG. 4A, rather than use a single battery or battery pack (as shown in FIG. 3B), multiple batteries (or battery packs) are used—that is, inserted into a single housing. Use of a single battery for a single battery housing may necessitate that the battery has exact matching dimensions as the housing. However, in some instances it may not be possible or desirable that battery packs and battery housings have the exact same dimensions. In this regard, it may not be possible to use a single uniform-sized housing in all possible platforms due to variations in type, size, shape, configurations, etc. among such platforms (e.g., different types of vehicles, different sizes, different shapes, different configurations, etc.). For example, trucks may allow for use of larger battery housings than buses, cars, etc. Further, larger trucks may allow for use larger battery housings than smaller trucks.

Accordingly, example implementations in accordance with the present disclosure may support and accommodate such variations, particularly for allowing for and supporting use of swappable batteries and/or battery housings of different sizes and/or shapes. For example, multiple predefined battery housing types (each corresponding to a particular size, configuration, etc.) may be defined.

To facilitate use of different battery housings, the size and/or shape of swappable batteries may be selected and/or configured to optimize operations. This may be done by reducing the size of swappable batteries, to the extent possible without degrading charging/discharging performance, so that the batteries may be used in the smallest housing needed. The same may be done with the shape of the batteries. Further, to avoid having to unnecessarily produce or use batteries of different size or shapes, the battery housings (and the battery-swapping fueling stations) may be adapted to allow use of batteries that do not match the housing (e.g., in terms of size, shape, etc.). This may allow for using multiple swappable batteries within a single battery housing, as illustrated in FIG. 4A, with the multiple swappable batteries 420 being inserted at the battery-swapping fueling station into the battery housing 410.

In this regard, the battery-swapping fueling station (and components thereof—e.g., battery handling mechanism(s) thereof) may be configured to support such deployment (e.g., insertion) of multiple batteries. For example, after identifying the battery housing in each electric vehicle (e.g., by determining the type identifier of the battery housing), the number of batteries required, and (optionally) arrangement of the batteries may be determined, and the batteries may be packaged in the required manner and then inserted (e.g., as a group) in a drawer-like slide motion, as shown in FIG. 4A.

Further, to facilitate and support such use of multiple batteries packs, batteries packs may be configured to support grouping of the multiple batteries. This may be done by configuring the same interfaces (and/or connectors) otherwise used to connect to electric vehicle when the batteries are deployed therein (e.g., inserted into battery housing thereof) to also support inter-battery connectivity when multiple batteries grouped together. Alternatively or additionally, the batteries may be configured to incorporate dedicated components for facilitating and supporting inter-battery connections when the batteries are grouped together.

For example, the batteries packs may incorporate components for allowing connection of the positive and negative terminals of the battery packs. Similarly, the connectors and/or interface with the battery housing may be adaptively configured to support use of the multiple battery packs.

With respect to the arrangement of batteries, in some implementations the swappable batteries may be configured to support use of different orientations, which further enhances use in different battery housings. This is illustrated in and described in more detail with respect to FIG. 4B.

Figure 4B:
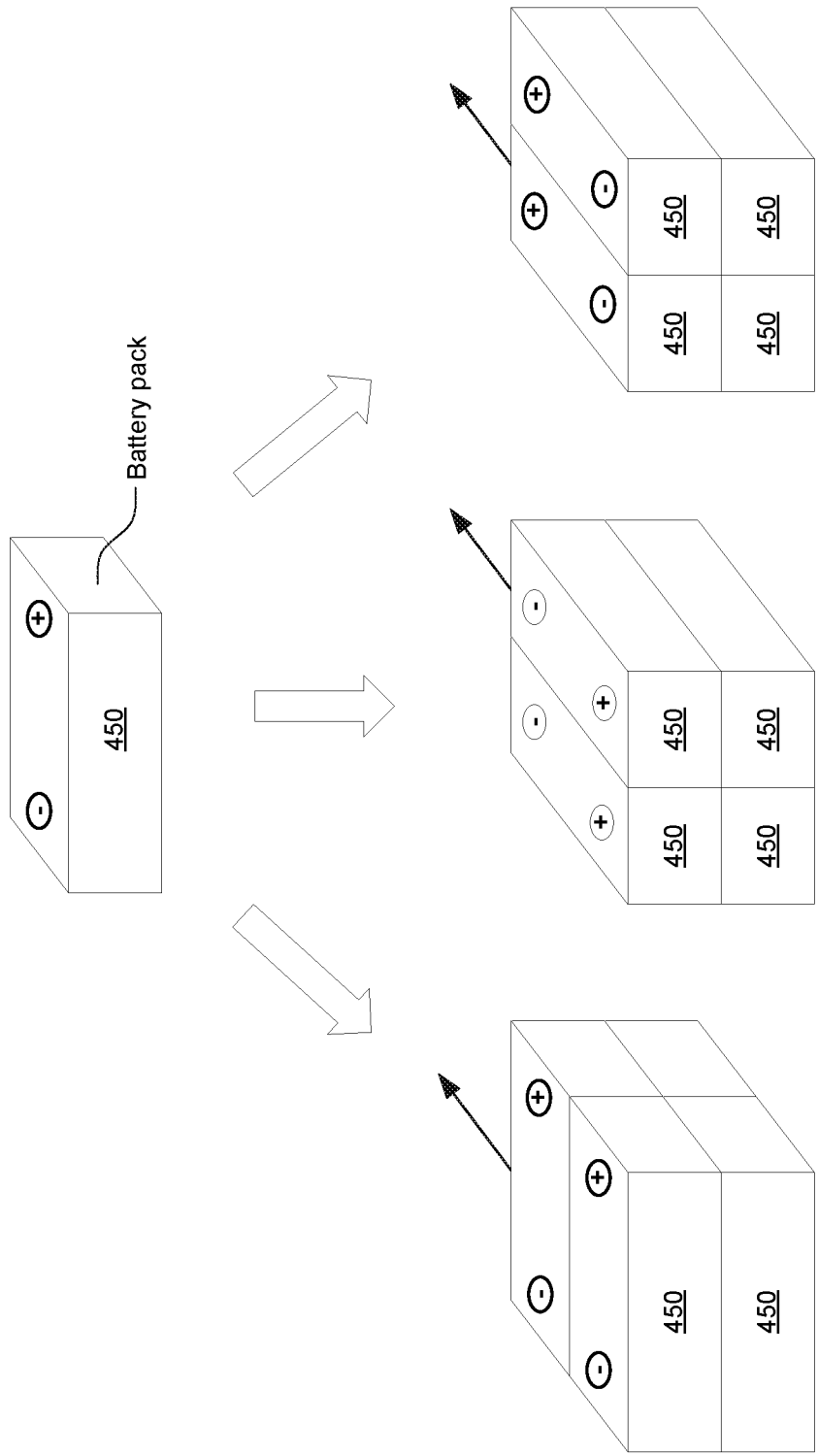
FIG. 4B illustrates an example swappable battery configured for facilitating adaptive and variable use of multiple batteries.

FIG. 4B illustrates an example swappable battery configured for facilitating adaptive and variable use of multiple batteries. Shown in FIG. 4B is swappable battery pack 450.

The swappable battery pack 450 may be configured for supporting adaptive deployment in different battery housings. In this regard, size of the swappable battery pack 450 may be made as small as possible, without resulting in any degradation in performance. For example, size of the swappable battery pack 450 may be set to match the smallest supported battery housing. Shape of the swappable battery pack 450 may similarly be adaptively selected. For example, shape of the swappable battery pack 450 may be set to enable use in all or at least as many as possible of supported battery housings.

For example, as shown in the example implementation illustrated in FIG. 4B, the swappable battery pack 450 may have a rectangular block shape, which may be optimal for stacking multiple instances of the swappable battery pack 450, such as when it is being used in battery housings that are larger than the battery pack. To further enhance performance, the swappable battery pack 450 may further be configured to support use in different arrangements (e.g., orientations), which may allow use in battery housing of different configurations—e.g., with respect to the location or type of connectors/interface between the housings and batteries.

For example, as illustrated in FIG. 4B, the swappable battery pack 450 may be arranged based on the orientation of the positive and negative terminals thereof, including when multiple instances thereof are used (e.g., packaged together), for deployment (e.g., insertion) in different ways—e.g., sideways with the positive terminals lined up to the right, or inward with the positive (or negative) terminals lined to the inside (or outside).

Figure 5A:
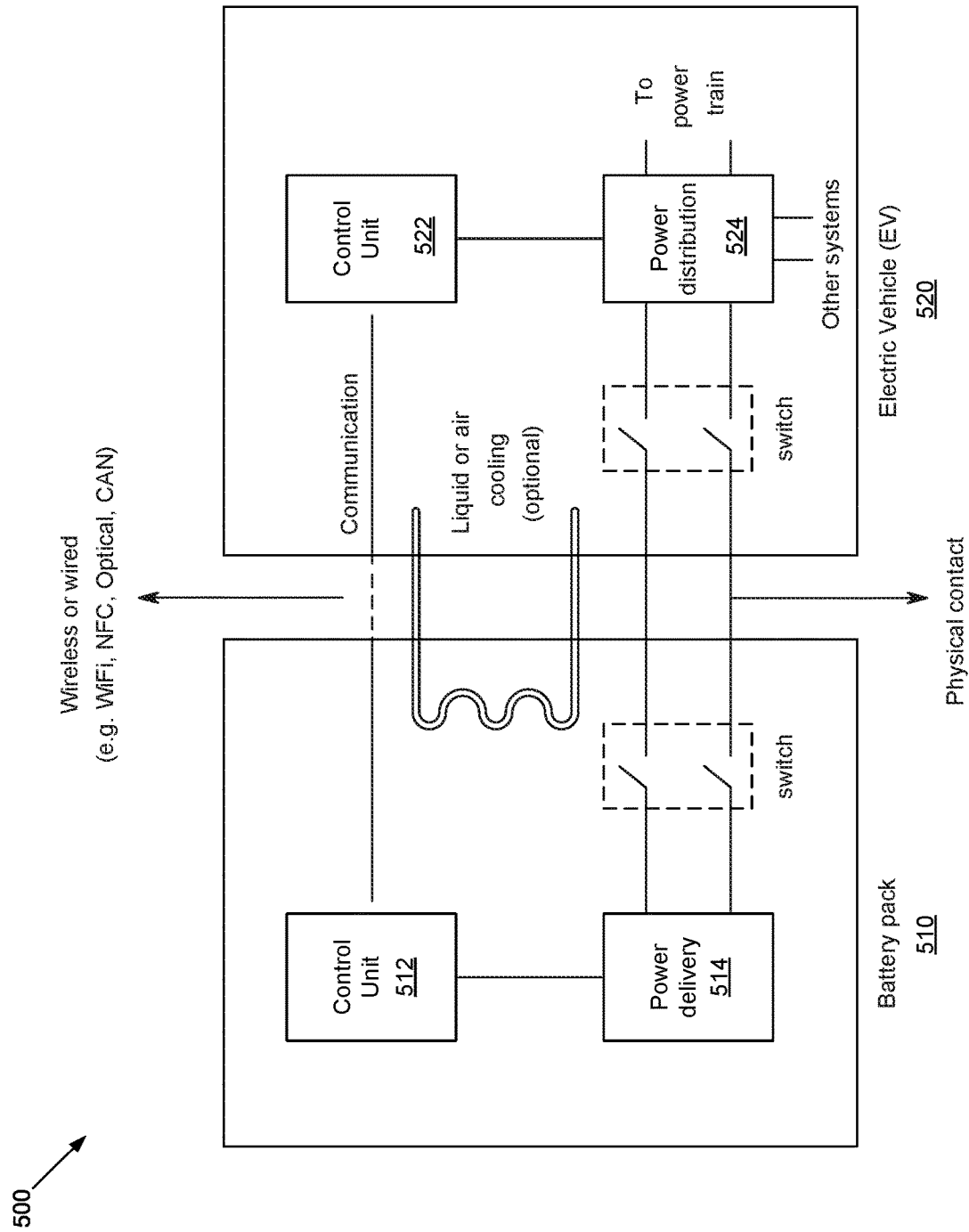
FIG. 5A illustrates an example battery interface for use with swappable batteries in electric vehicles.

FIG. 5A illustrates an example battery interface for use with swappable batteries in electric vehicles. Shown in FIG. 5A is a battery interface 500 between a swappable battery 510 and an electric vehicle 520.

The battery interface 500 may comprise one or more connections. The one or more connections may comprise physical connectors used in power delivery. The one or more connections may also comprise communication related connections. In this regard, communication related connections may be of various types, such as wired, wireless, and optical. Examples of wired connections include Controller Area Network (CAN bus) based connections. Examples of wireless connections include Wi-Fi (Wireless Fidelity), NFC (Near-Field Communication), etc., based connections. The connections of the battery interface 500 may be utilized primarily in providing power from the swappable battery 510 into the electric vehicle 520, but may also be used in or configured for providing or supporting other functions.

For example, the connections of the battery interface 500 may be used in supporting or facilitating communication related functions, which may be used in conjunction with (e.g., battery or battery pack) management and/or control related functions. Further, in some instances, the battery interface 500 may include heating, ventilation, and air conditioning (HVAC) based connections, which may be used in supporting or facilitating HVAC relating functions—e.g., for ensuring that the battery 510 operates in under optimal conditions. In this regard, the HVAC based connections may be used for heating, cooling, ventilating, or any combination thereof of the battery 510, such as based on a pre-defined climatic profile for the battery. Various types of HVAC connections may be used or supported. For example, the battery interface 500 may incorporate liquid or air cooling connections.

The swappable battery 510 and the electric vehicle 520 may comprise suitable components for supporting and utilizing the battery interface 500 and/or connections thereof. In this regard, such components may comprise suitable circuitry (either dedicated or existing circuitry) configured to provide functions associated with the battery interface 500. Further, while not shown in FIG. 5A, the swappable battery 510 comprises suitable components(s) for storage, charging, and discharging of electrical power. In this regard, the disclosure is not limited to any particular technology for facilitating charge, storage, and discharge of electrical power, and any suitable technology may be used.

In the example implementation illustrated in FIG. 5A, the swappable battery 510 comprises battery-side control unit 512 and a power delivery unit 514, whereas the electric vehicle 520 comprises a vehicle-side control unit 522 and a power distribution unit 524. Each of the battery-side control unit 512, the power delivery unit 514, the vehicle-side control unit 522, and the power distribution unit 524 may comprise suitable circuitry configured for performing the operations or functions attributed thereto.

With respect to power delivery or energy transfer, power may be delivered from the swappable battery 510 into the electric vehicle 520 via the battery interface 500 through one or more power-delivery connections (e.g., via physical connector(s)) between the power delivery unit 514 and the power distribution unit 524. The power delivery unit 514 and the power distribution unit 524 may comprise suitable hardware for facilitating the delivery of power via the one or more power-delivery connections. In some instances, switching elements may be used to allow for selective delivery of power. In this regard, the switching elements may be used to enable delivery of power (e.g., by closing the switching elements, thus completing the connections) or disable delivery of power (e.g., by opening the switching elements, thus disconnecting the connections) under particular conditions. This control may be done using control signals (e.g., by the battery-side control unit 512 and/or the vehicle-side control unit 522, such as based on a state machine).

The battery interface 500 may also comprise one or more communication connections, for use in facilitating communications between the swappable battery 510 and the electric vehicle 520. In this regard, various types of communication may be performed via the battery interface 500. For example, communication may comprise power delivery (or energy transfer) related communication sequences (e.g., safety checks, handshakes, etc.). Power-related communication may also be used for controlling certain aspects of power delivery, such as independent pack energy transfer rate (e.g., based on requests and control signals issued by the electric vehicles 520, such as via the vehicle-side control unit 522). Communication may also comprise exchange data (e.g., GPS position), negotiation of parameters (e.g., max voltage, current limits, etc.). Another type of communication via the battery interface 500 may comprise discoverable application layer protocols related communications (e.g., value added services).

In an example implementation, the battery interface 500 may be configured for operation in accordance with a predefined state machine. Such state machine may comprise one or more states, with corresponding conditions for transition to and/or from, and/or actions that may be performed in each state. An example state machine is illustrated in and described with respect to FIG. 5B.

In an example implementation, the battery interface 500 may be configured to support use of multiple batteries within a single battery housing, as described with respect to FIGS. 4A and 4B. Various techniques and approaches may be used to facilitate such support. For example, in some instances, multiple batteries may be packaged into a single package before being inserted in the battery housing with the package being connected to and interfacing with the electric vehicle 520 in the same manner battery pack 510 is connected and used. In other words, the package of multiple batteries may simulate a single battery for purposes of connecting to and interfacing with the battery housing in the electric vehicle. Alternatively, one of the multiple batteries may be connected to and interface with the electric vehicle 520 on behalf of the remaining batteries. In such use scenarios, the batteries may be inter-connected to one another to facilitate delivery of power to and communication with the electric vehicle 520 via the connected battery.

Further, in such implementations where multiple batteries are utilized, the batteries may be configured to share HVAC based connections, which may be used in supporting or facilitating HVAC relating functions in each of the batteries. For example, at least some of the batteries may be incorporate battery-to-battery HVAC connectors, to facilitate distributing and circulating HVAC material among the batteries.

In an example implementation, vehicle-side control units (e.g., the vehicle-side control unit 522 in FIG. 5A) may be configured to combine power from a mix of different battery packs. Such different battery packs may have different battery cell chemistries, power characteristics, battery age, etc. Such capability—that is, supporting use of mix of different battery packs—may allow the electric vehicle to use a mix of all types of batteries in circulation within the platform/infrastructure.

Figure 5B:
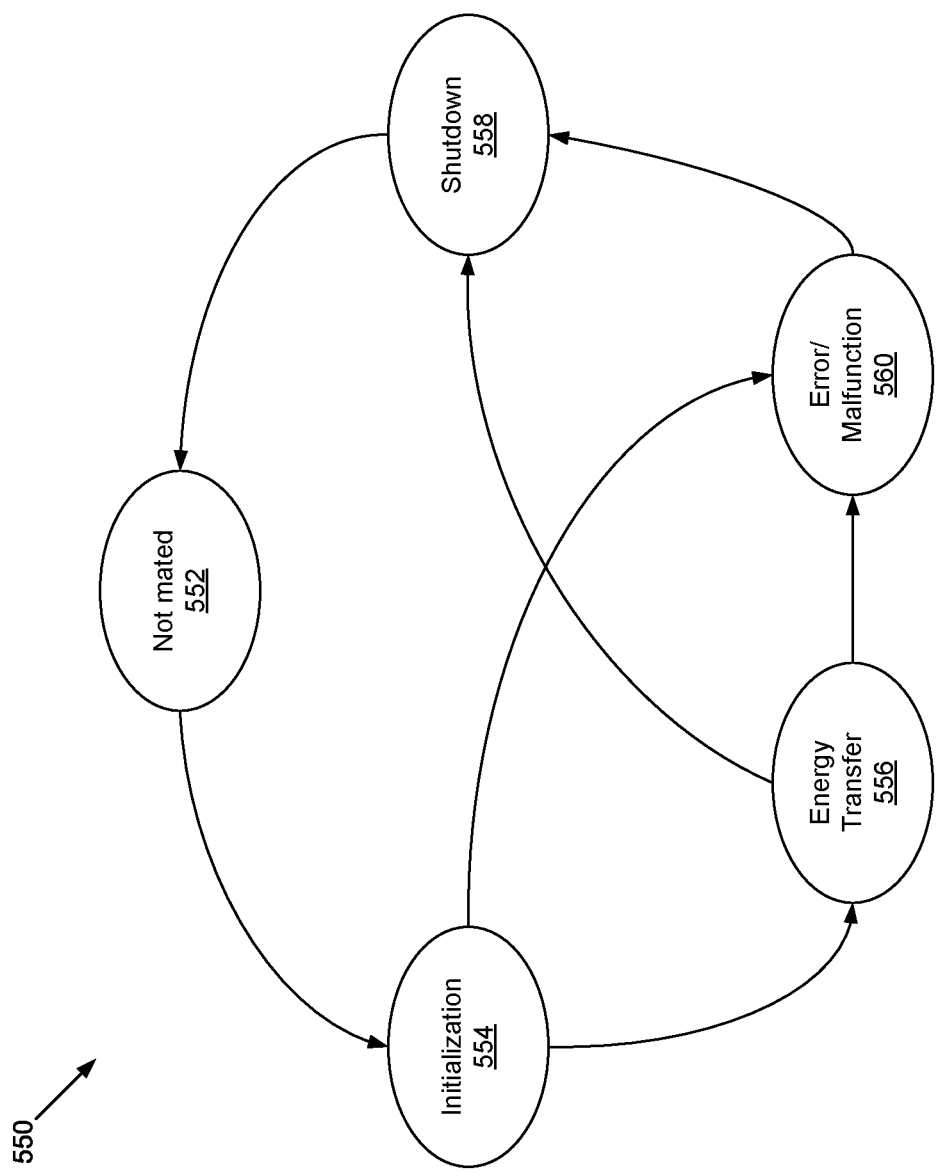
FIG. 5B illustrates an example state machine for use in controlling a battery interface used for swappable batteries in electric vehicles.

FIG. 5B illustrates an example state machine for use in controlling a battery interface used for swappable batteries in electric vehicles. Shown in FIG. 5B is state machine/flowchart 550, which may be used in conjunction with control of battery interfaces, such as battery interface 500 of FIG. 5A.

The state machine 550 may be implemented in one or both sides of the battery interfaces (e.g., in one or both of the battery-side control unit 512 and the vehicle-side control unit 522). The state machine 550 may comprise a plurality of states, with each state associated with one or more conditions relating to one or more of the battery (or batteries), the vehicle (and the battery housing(s) thereof), and the battery interface itself. Further, one or more valid (or invalid) actions may be defined for each of the states. Transitions between the states may be triggered in response to one or more predefined conditions or actions. In the example implementation illustrated in FIG. 5B, the state machine 550 comprises the following states: 1) "not mated" state 552, 2) "initialization" state 554, 3) "energy transfer" state 556, 4) "shutdown" state 558, and 5) "error/malfunction" state 560.

The "not mated" state 552 corresponds to, for example, the condition(s) of the vehicle proximity not being detected and/or communication link(s) not being established. The "initialization" state 554 corresponds to, for example, the condition(s) of the battery being mated to the battery housing/EV but not being ready to initiate transfer of power, and/or the communication between the battery and the electric vehicle established (though other supplemental processes may not be completed). The "energy transfer" state 556 corresponds to, for example, the condition(s) of the vehicle contact(s)/connector(s) being closed, the current suppression being active, and/or periodic parameter renegotiation. The "shutdown" state 558 corresponds to, for example, the condition(s) of an ongoing pre-disconnecting procedure. The "error/malfunction" state 560 corresponds to error and/or malfunction conditions. For example, the "error/malfunction" state 560 may be triggered in response to safety check failure(s) and/or other errors, where the shutdown and/or disconnect procedures may be executed in response thereto. This may be done after a predefined time (e.g., 100 ms), such as to allow for any possible recovery.

Table 1 (below) includes example listing of comprehensive safety checks and monitoring conditions applicable in conjunction with determining when or if to trigger and/or transition to the "error/malfunction" state 560:

TABLE 1 safety checks and monitoring conditions

| | Before delivering high voltage/power | Continuous while delivering power |
|---|---|---|
| Physical latch | X | X |
| Temperature | X | X |
| Vehicle speed zero | X | |
| Electrical contact reliability | X | X |
| Electricals insulation | X | X |
| Vibration | X | X |
| Short circuit | X | X |

Figure 6:
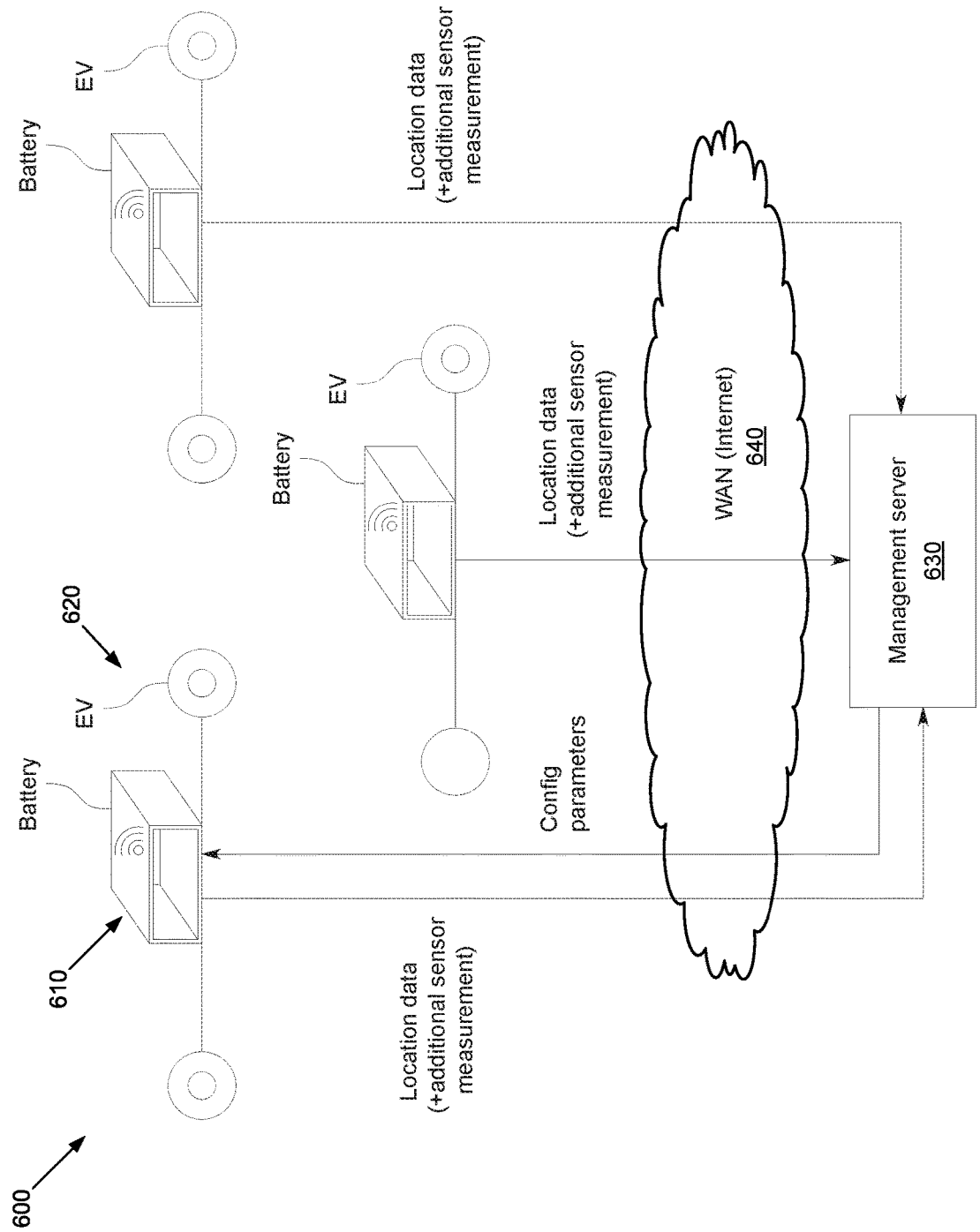
FIG. 6 illustrates example use of Smart swappable batteries with cloud-based control system.

FIG. 6 illustrates example use of Smart swappable batteries with cloud-based control system. Shown in FIG. 6 is a cloud-based network 600 configured for managing a plurality of swappable batteries 610 deployed in corresponding plurality of electric vehicles (EVs) 620. The cloud-based network 600 may comprise a cloud-based management server 630, which may interact with, and provide management services relating to the plurality of swappable batteries 610, such as via Wide area network (WAN) (e.g., Internet-based cloud) 640.

The cloud-based management server 630 may be configured to manage, support, and control swappable batteries and use thereof as described in this disclosure. The cloud-based management server 630 may comprise, for example, suitable circuitry (including, e.g., one or more of communication circuit(s), circuit(s), processing circuit(s), etc.) for performing the various functions and/or operations attributed to the cloud-based management server 630, particularly with respect to managing, supporting, and controlling swappable batteries.

While the cloud-based management server 630 is illustrated in FIG. 6 as a single device/system, the disclosure is not so limited. In this regard, in some instances, solutions in accordance with the present disclosure may be implemented in a distributed manner, with various functions attributed to the cloud-based management server 630 being performed by various elements (e.g., servers or other suitable systems) within or coupled to the WAN 640. Thus, in some example implementations, the cloud-based management server 630 may be implemented in a distributed manner, with some of the functions and/or operations attributed thereto being performed by different physical systems, devices or components that are part of and/or connected to the WAN 640.

In various implementations, swappable batteries may be configured to support communication functions, and such may be cloud-connected. This may be done by, for example, incorporating communication related resources (e.g., radios, transceiver circuitry, etc.) within the batteries. Alternatively, the batteries may utilize other systems for providing and facilitating communication services. For example, the battery housing may incorporate communication resources, and batteries may utilize such communication resources via the battery interface (e.g., interface 500 as described with respect to FIG. 5A). The batteries may also use communication resources of the electric vehicles (e.g., via the battery housing and the battery interface).

The cloud-connectivity may be utilized to support and/or optimize operation of the batteries. For example, batteries may be configured to utilize to the cloud-connectivity to continuously send data to cloud-based management servers (e.g., the cloud-based management server 630), which may use that data in enhancing or optimizing operation of the batteries. The data may comprise, for example, location related information (e.g., positioning related data, such as Global Positioning System (GPS) based location data), sensory information (e.g., sensor measurements), and the like. The cloud-based management servers (e.g., the cloud-based management server 630) may also utilize cloud-connectivity to communicate with the batteries, such as to send data relating to operation of the batteries, such as over-the-air firmware update (OTA), configuration updates, etc.

Figure 7:
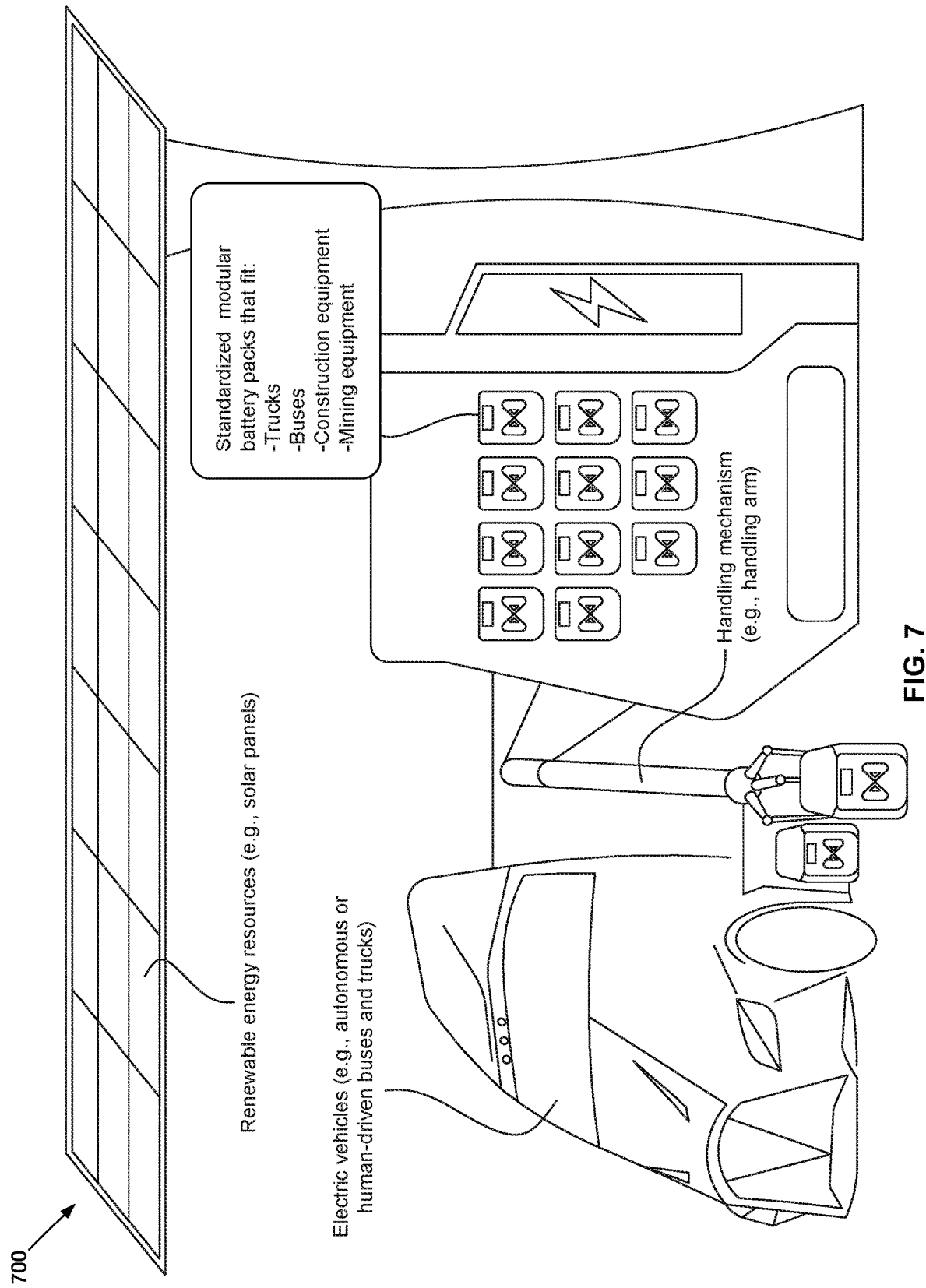
FIG. 7 illustrates an example battery-swapping fueling station.

FIG. 7 illustrates an example battery-swapping fueling station. Shown in FIG. 7 is a battery-swapping fueling station 700 configured for supporting battery-swapping services.

The battery-swapping fueling station 700 may be configured for supporting swapping of batteries in electric vehicles as described herein. In this regard, battery-swapping fueling station 700 may be configured performing battery-swapping operations in efficient manner, particularly to ensure doing so in relatively short time (e.g., few minutes) so that "fueling" electric vehicles may be comparable to conventional fueling.

The battery-swapping fueling station 700 may comprise various components for facilitating and supporting the battery-swapping operations, as well as for supporting ancillary functions and services. For example, in the implementation illustrated in FIG. 7, the battery-swapping fueling station 700 comprises standardized modular battery packs, battery handling mechanism(s), battery charger(s), grid connectors, and communication resources.

The standardized modular battery packs comprises housings or bays for inserting batteries therein. In this regard, the battery housings or bays may be configured based on a standardized battery size (with the housings or bays in the electric vehicles similarly configured based on the same battery-swapping fueling station 700). The battery packs may be implemented as (or housed within) a secure container, to ensure safe and secure in operation under all conditions (particularly in an outdoor environment). This may comprise use of weather-proofing measures, use of strong and shock resistance material on exterior, incorporating measures to protect against impact (e.g., vehicle hitting the racks), etc.

The battery handling mechanism(s) may be configured for use in handling batteries in conjunction with the operation of the battery-swapping fueling station. For example, the battery handling mechanism(s) may be configured for use in swapping batteries in electric vehicles—e.g., removing batteries in the vehicles, placing them in open housings/bays in the racks (or on the side, if none are open), removing batteries from the racks and inserting them into the vehicle. The battery handling mechanism(s) may also be configured for use in transport and/or placement/removal of batteries into and/or out of the battery racks during non-refueling operations (e.g., when loading or unloading the battery-swapping fueling station, such as by operator of the station). Various designs or solutions may be used in implementing the battery handling mechanism(s), and the disclosure is not limited to any particular design or approach. For example, the battery handling mechanism(s) may be implemented using carts, arms, rails, etc., or any combination thereof. Further, the design and/or implementation of the battery handling mechanism(s) may be adaptively set or adjusted, such as based on the operation of battery handling mechanism(s) (e.g., mode of operation, which may comprise such modes as fully-autonomous, semi-autonomous, manual mode, remotely-controlled, etc.). An example implementation using a handling arm is described in more detail below, with respect to FIG. 7.

The battery charger(s) may be configured for charging batteries inserted in the housing/bays of the battery racks. In this regard, the battery charger(s) may be implemented as separate components, or may be incorporate into the battery racks (or even into the individual housing/bays of the battery racks). Power used in charging may be obtained from the electrical grid (via suitable connections between the station and the electrical grids) and/or from local sources. In this regard, in some instances, battery-swapping fueling stations (e.g., the battery-swapping fueling station 700) may incorporate resources for generation of renewable energy, such as by using solar panels (as illustrated in FIG. 7), wind turbines, and the like. Relatedly, battery packs maybe configurable as distributed energy resources (DERs) to enable feeding electricity into the electrical grid (when needed).

The communication resources may comprise radios, transceiver circuitry, etc. to support communication operations (e.g., wired, wireless, etc.). This may enable communicating with batteries when inserted, communication with the vehicles (e.g., when using or approaching the station), communication with centralized entities (e.g., cloud-based servers, main control facilities, etc.).

In some instances, battery-swapping fueling stations (e.g., the battery-swapping fueling station 700) may support or incorporate additional measures for enhancing safety, particularly during battery-swapping operations. For example, batteries may be hot swappable, connectors (in the station and/or vehicle) may incorporate securing components, to ensure the batteries are secured once inserted, and the like.

Figure 8:
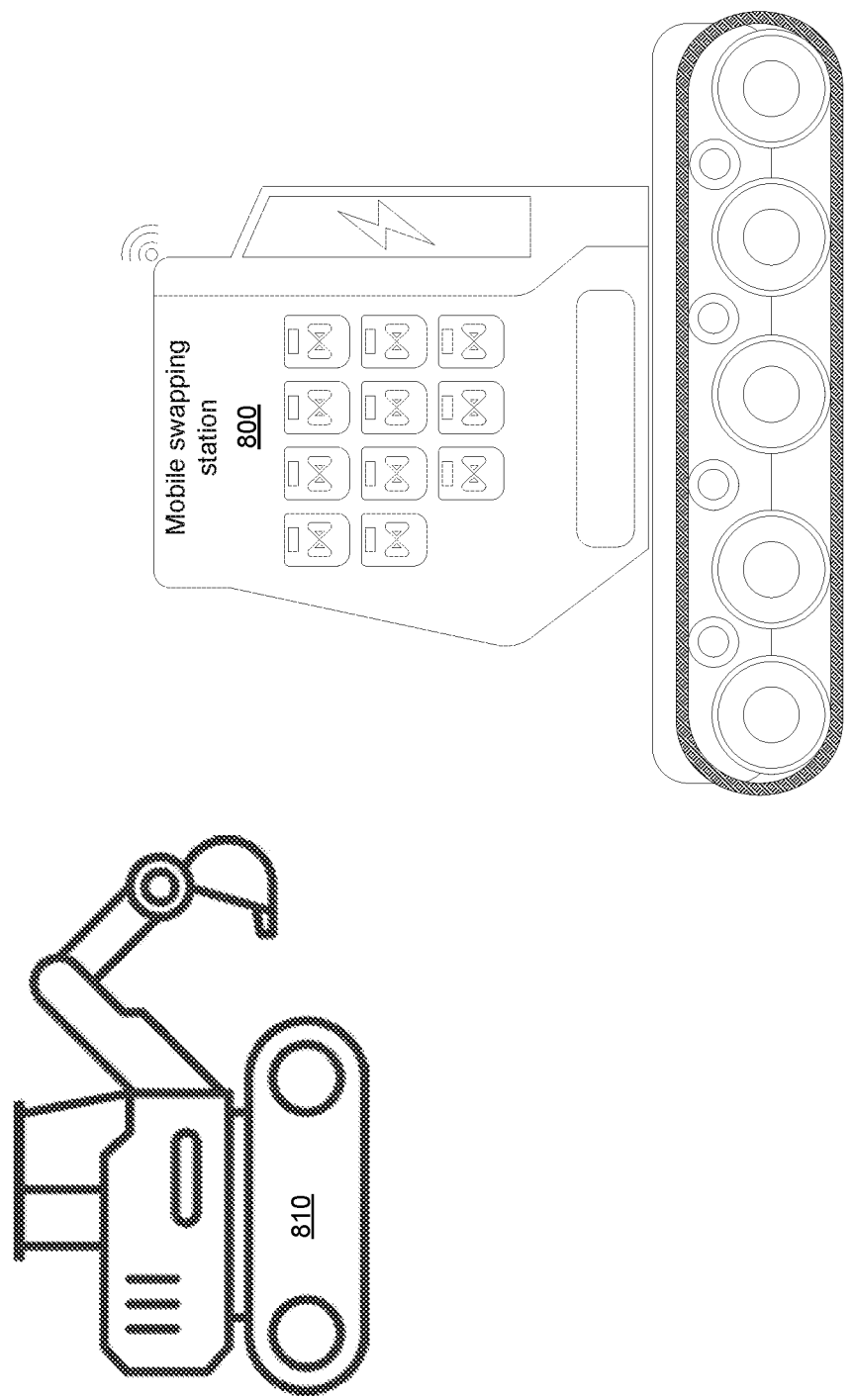
FIG. 8 illustrates an example mobile battery-swapping fueling station.

FIG. 8 illustrates an example mobile battery-swapping fueling station. Shown in FIG. 8 is a mobile battery-swapping fueling station 800 configured for supporting battery-swapping services.

The mobile battery-swapping fueling station 800 may be substantially similar to the battery-swapping fueling station 700, and may operate in substantially similar manner. However, the mobile battery-swapping fueling station 800 may also be configured for mobility—that is, supporting mobile operation, particularly for providing fueling services in mobile manner. For example, the mobile battery-swapping fueling station 800 may comprise, similar to the battery-swapping fueling station 700, such components as racks with battery bays/housings, battery handling mechanism(s), chargers, etc., but rather than being installed at a fixed location, these components may be deployed on a moving platform, such as a wheeled or tracked chassis. This may enable moving the mobile battery-swapping fueling station 800, such as for redeployment and/or for bringing the battery-swapping services to the electric vehicles.

Such mobility may be particularly desirable with certain operation conditions and/or with certain types of electric vehicles. For example, use of mobile battery-swapping fueling stations may be desirable in conjunction with such operation conditions as construction and mining. Thus, mobile battery-swapping fueling stations (e.g., the mobile battery-swapping fueling station 800) may be (re-)deployed to construction sites or mining locations, as needed, and/or may be moved to the construction or mining equipment to provide the battery-swapping services on-site, as illustrated in FIG. 8 (with the mobile battery-swapping fueling station 800 operating at a mining site, providing battery-swapping services to an electric excavator 810).

Figure 9:
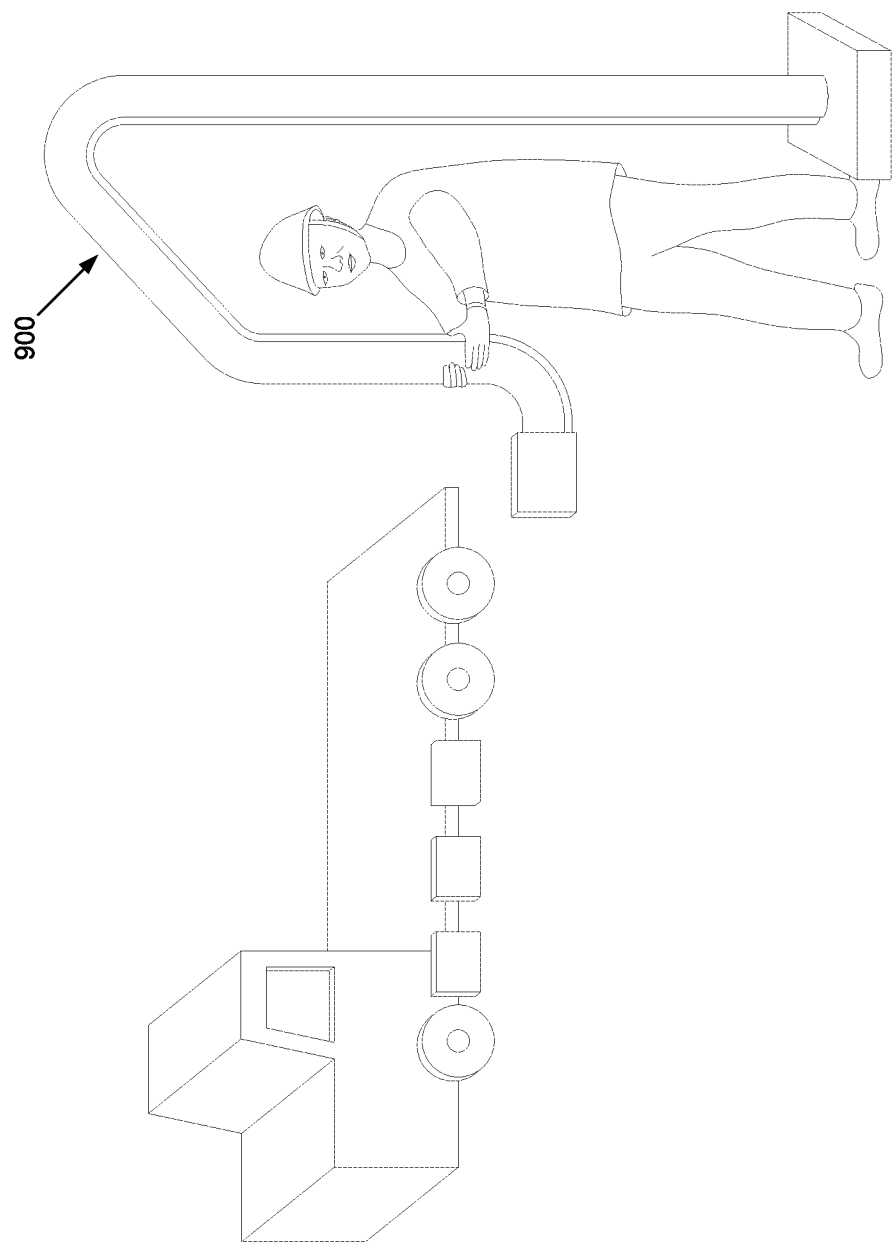
FIG. 9 illustrates an example powered battery handling arm for use in swapping batteries in a battery-swapping fueling stations.

FIG. 9 illustrates an example powered battery handling arm for use in swapping batteries in a battery-swapping fueling stations. Shown in FIG. 9 is a handling arm 900 which may be used in battery-swapping fueling stations (e.g., the battery-swapping fueling station 700 of FIG. 7 and/or the battery-swapping fueling station 800 of FIG. 8).

The handling arm 900 may comprise suitable hardware (and related suitable circuitry) for use in moving batteries between the battery-swapping fueling stations (particularly, from components that house the swappable batteries therein, such as racks of battery bays) and vehicles using the battery-swapping fueling stations. The handling arm 900 may be adaptively configured for handling the batteries and swapping thereof, such as based on the manner of inserting/removing of the battery. For example, as illustrated in FIG. 9, the handling arm 900 may be configured for inserting/removing batteries in drawer-like slide motions.

The handling arm 900 may be configured for operations in one or more of a plurality of possible modes of operation. For example, the handling arm 900 may be configured for operation in fully-autonomous mode (e.g., without any involvement by a human, whether an operator of the station or the vehicle), in semi-autonomous mode (e.g., based on combined actions of a human and machine), and in manual mode, with the human operator (user of the vehicle or operator of the station) operating the handling arm 900 to facilitate the insertion and/or removal of batteries. Nonetheless, even in the manual mode, some measure of mechanical contribution may still be used (e.g., some hydraulics or pneumatics capabilities for assisting the operator in gripping, manipulating and moving the batteries). Handling arms (e.g., the handling arm 900) may also support a remotely-controlled mode, where an operator (e.g., one or both of the EV operator and a station operator) may remotely control at least some of the operation of handling arm—e.g., the insertion of the batteries. For example, the arm may be remotely operated, such as from a "call center".

The design and implementation of handling arms (e.g., the handling arm 900) may incorporate additionally measures or component for accounting for and assisting with various conditions that are pertinent to battery-swapping operations. For example, the handling arm 900 may incorporate sensors (e.g., visual, or the like) to ensure accurate positioning of the batteries when inserting them into the vehicle or the battery-swapping fueling station. The battery-swapping fueling station may incorporate additional measures to ensure meeting other required precision criteria, particularly with respect to the vehicles using the battery-swapping fueling stations. For example, battery-swapping fueling station may be designed and/or may incorporate sensors to ensure precision of vehicle parking during swapping operations.

The handling arms may also configured to account for various types of vehicles (and particularly variations in size thereof) to ensure that these arms may be used with different vehicle sizes (bus, small truck, big truck, construction or mining equipment, etc.). Further, handling arms may be configured for outdoor operation, and as such may be weather-proofed to ensure operation in different weather and environmental conditions (dirt, rain, snow, etc.). In some implementations, the handling arms may incorporate measures for protection against inadvertent adverse operation (particularly in conjunction with manual mode of operation).

Figure 10:
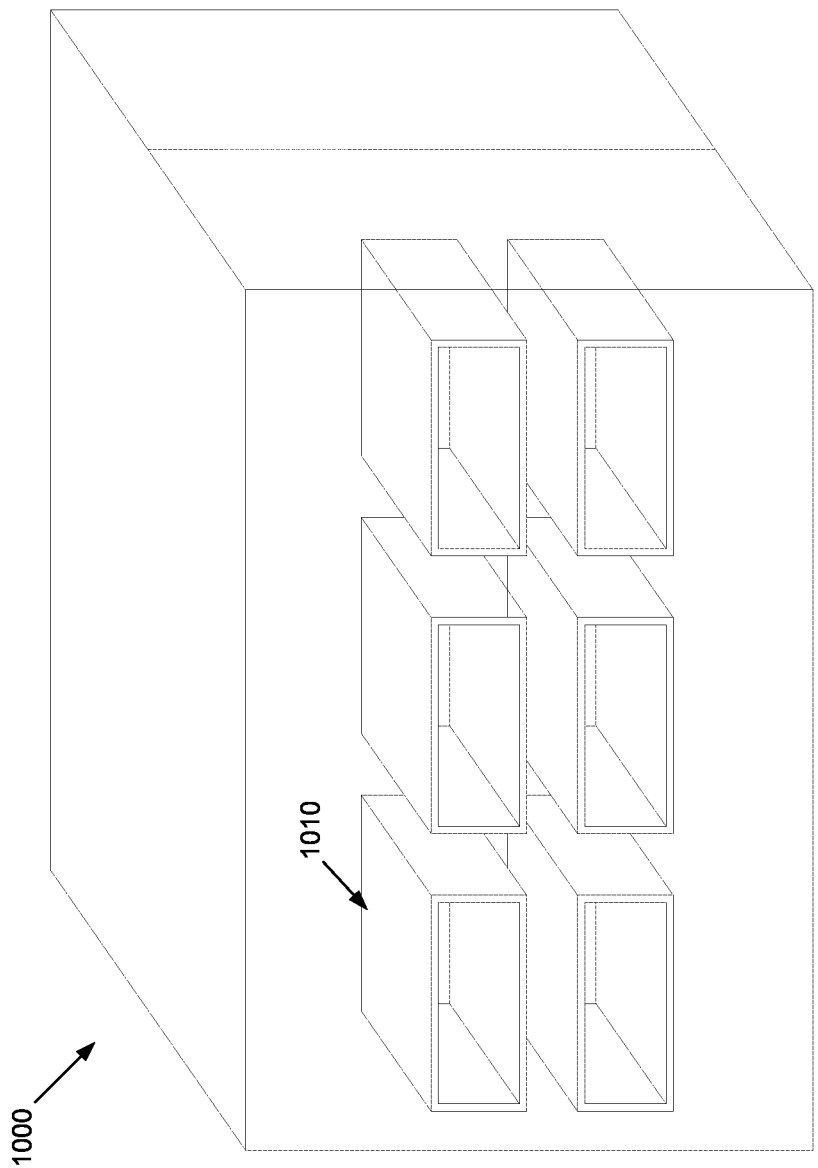
FIG. 10 illustrates an example rack of battery bays for use in battery-swapping fueling stations.

FIG. 10 illustrates an example rack of battery bays for use in battery-swapping fueling stations. Shown in FIG. 10 is a rack 1000 which may be used in battery-swapping fueling stations (e.g., the battery-swapping fueling station 700 of FIG. 7 and/or the mobile battery-swapping fueling station 800 of FIG. 8).

The rack 1000 may comprise a plurality of battery bays 1010, each configured for receiving and mating with a swappable battery. In this regard, the battery bays 1010 are configured such that they match the vehicle battery housings. In some instances, each of the battery bays 1010 may incorporate a rack-based battery interface for engaging and operating batteries when such batteries are inserted therein.

The rack-based battery interface may be substantially similar to the battery interface 500 used in the vehicle battery housing, for supporting interactions between the battery and the electric vehicle. The battery interface used in the rack 1000 may be modified, however, to allow providing power to the battery, to facilitate charging thereof. In some instances, the rack-based battery interface may also support communication between the rack (and thus the battery-swapping fueling station) and the battery, which may ensure that the batteries may remain cloud-connected while inserted into the rack.

Figure 11:
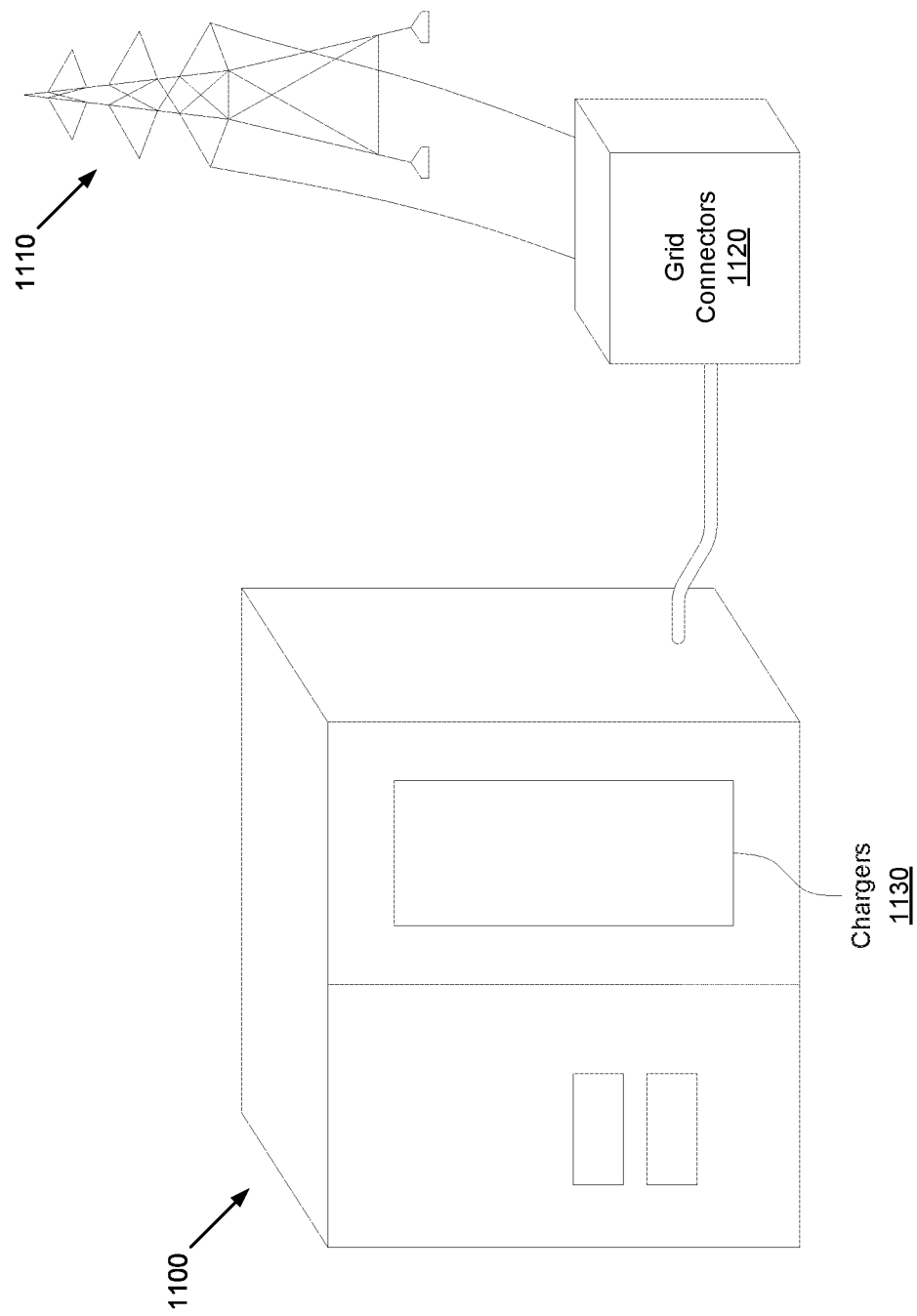
FIG. 11 illustrates example grid connections of a battery-swapping fueling station.

FIG. 11 illustrates example grid connections of a battery-swapping fueling station. Shown in FIG. 11 are battery-swapping fueling station 1100, electrical grid 1110 (or portion thereof), and grid connectors 1120.

The battery-swapping fueling station 1100 may be similar to the battery-swapping fueling station 700 of FIG. 7 and/or the battery-swapping fueling station 800 of FIG. 8. The electrical grid 1110 may be similar to the electrical grid 150 as described with respect to FIG. 1. In this regard, the portion of electrical grid 1110 that is closest to the battery-swapping fueling station 1100, and to which the battery-swapping fueling station 1100 may be connected, may comprise high voltage/power transmission lines.

The grid connectors 1120 may comprise hardware (and related circuitry) configured for providing connectivity between the battery-swapping fueling station 1100 and the electrical grid 1110, and for applying various functions associating with facilitating the supply of electrical power from the electrical grid 1110 to the battery-swapping fueling station 1100. Such functions may comprise, for example, required voltage adjustments (e.g., stepping down voltage, etc.) and the like. The grid connectors 1120 may comprise switches, step-down transformers, etc.

In operation, the grid connectors 1120 may be used to supply electric power from the electrical grid 1110 to the battery-swapping fueling station 1100, and may apply any required adjustments to ensure the supplied power meets any preset criteria (e.g., particular voltage range, type, etc.). The battery-swapping fueling station 1100 may use the supplied power in charging swappable batteries that are in the battery-swapping fueling station 1100 (e.g., inserted in to battery bays in racks, such as the rack 1000 of FIG. 10). In this regard, battery-swapping fueling stations (e.g., the battery-swapping fueling station 1100) may comprise dedicated components for utilizing the received power in charging operations. For example, as illustrated in FIG. 11, the battery-swapping fueling station 1100 may comprise one or more charging components 1130. The charging component 1130 may comprise, for example, a direct current fast charger (DC FC).

In some instances, battery-swapping fueling stations (e.g., the battery-swapping fueling station 1100) may be used to supply power back into the electrical grid. This may be done in instances where the battery-swapping fueling stations incorporate means for generating power (e.g., using solar panels) and/or even from batteries in the battery-swapping fueling stations (e.g., in cases of emergency). Accordingly, the grid connectors 1120 may be configured to facilitate providing power in that direction—that is, providing power into the electrical grid—including providing any required adjustments (e.g., step-up voltage, etc.).

In some implementations, battery-swapping fueling stations may be configured for supporting selective or temporary connectivity to the electrical grids. This may be particularly done in mobile battery-swapping fueling stations, such as the mobile battery-swapping fueling station 800 of FIG. 8 for example. Such selective connectivity allows for disconnecting from the electrical grid when the station is on the move, and for connecting only when needing to charge batteries inserted in the station.

Figure 12:
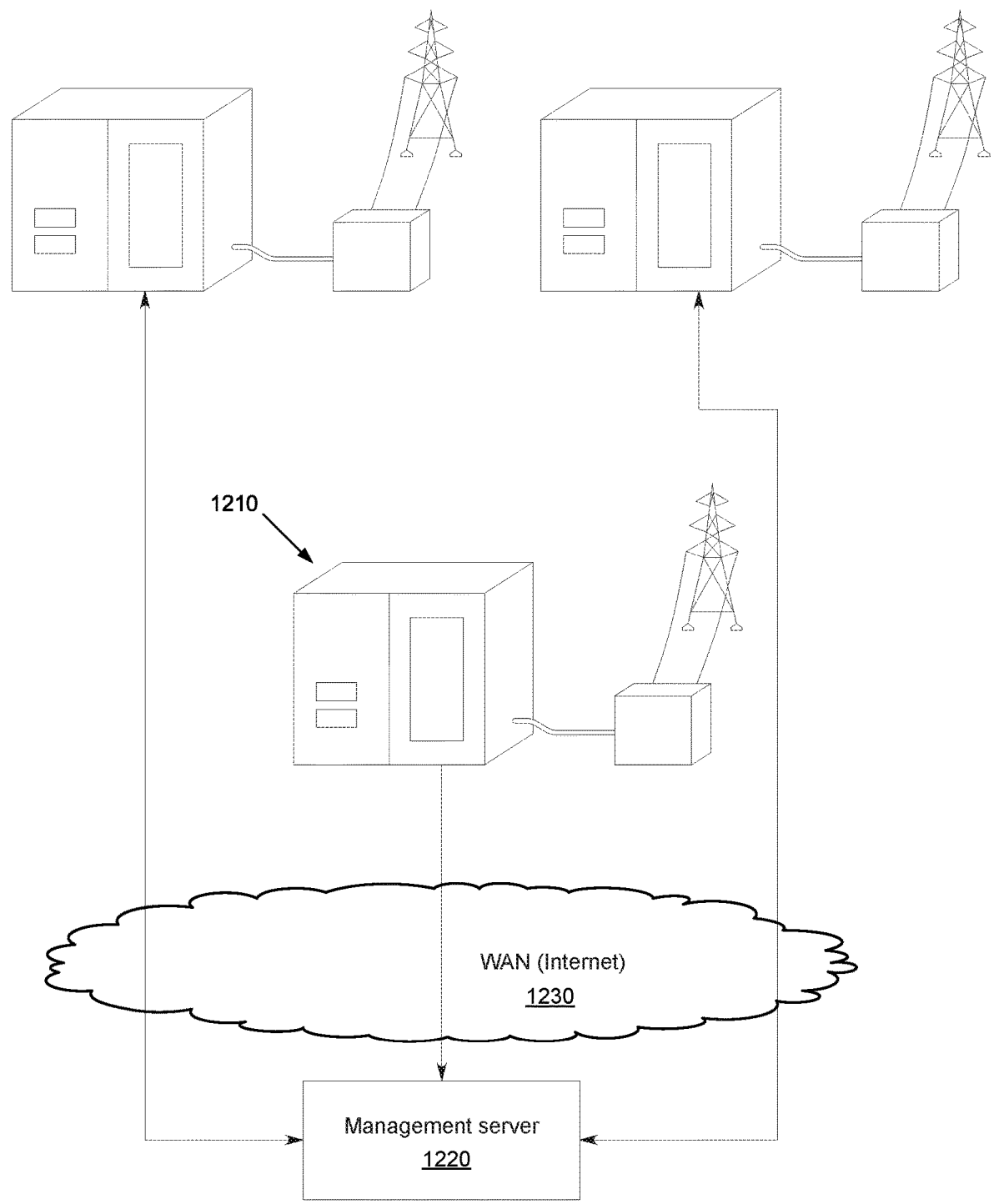
FIG. 12 illustrates example use of battery-swapping fueling stations with cloud-based control system.

FIG. 12 illustrates example use of battery-swapping fueling stations with cloud-based control system. Shown in FIG. 12 is a cloud-based network 1200 configured for managing a plurality of battery-swapping fueling stations 1210. The cloud-based network 1200 may comprise a cloud-based management server 1220, which may interact with, and provide management services relating to, the plurality of battery-swapping fueling stations 1210, such as via wide area network (WAN) (e.g., Internet-based cloud) 1230.

The cloud-based management server 1220 may be configured to manage, support, and control battery-swapping fueling stations and use thereof as described in this disclosure. The cloud-based management server 1220 may comprise, for example, suitable circuitry (including, e.g., one or more of communication circuit(s), circuit(s), processing circuit(s), etc.) for performing the various functions and/or operations attributed to the cloud-based management server 1220, particularly with respect to managing, supporting, and controlling battery-swapping fueling stations.

While the cloud-based management server 1220 is illustrated in FIG. 12 as a single device/system, the disclosure is not so limited. In this regard, in some instances, solutions in accordance with the present disclosure may be implemented in a distributed manner, with various functions attributed to the cloud-based management server 1220 being performed by various elements (e.g., servers or other suitable systems) within or coupled to the WAN 1230. Thus, in some example implementations, the cloud-based management server 1220 may be implemented in a distributed manner, with some of the functions and/or operations attributed thereto being performed by different physical systems, devices or components that are part of and/or connected to the WAN 1230.

In various implementations, battery-swapping fueling stations may be configured to support communication functions, and as such may be cloud-connected. This may be done by, for example, incorporating communication related resources (e.g., radios, transceiver circuitry, etc.) into the battery-swapping fueling stations. Alternatively, the battery-swapping fueling stations may utilize other systems for providing and facilitating communication services.

The cloud-connectivity may be utilized to support and/or optimize operation of the battery-swapping fueling stations. For example, the battery-swapping fueling stations may be configured to utilize the cloud-connectivity to continuously send data to cloud-based management servers (e.g., the cloud-based management server 1220), which may use that data in enhancing or optimizing operation of the battery-swapping fueling stations. The cloud-based management servers (e.g., the cloud-based management server 1220) may also utilize the cloud-connectivity to communicate with the battery-swapping fueling stations, such as to send data relating to operation of the battery-swapping fueling stations and optimizing thereof. For example, the cloud-based management servers (e.g., the cloud-based management server 1220) may generate and communicate to the battery-swapping fueling stations such data as charger control firmware updates, grid level optimization (e.g., for minimizing peak demand), etc.

In some instances, the cloud-connectivity between the cloud-based management servers (e.g., the cloud-based management server 1220) and battery-swapping fueling stations may be utilize for facilitating interactions with the batteries at the battery-swapping fueling stations (e.g., when inserted within the racks of battery bays, or when inserted/mated to electric vehicles that may be the refueling in the battery-swapping fueling stations). For example, the cloud-connectivity between the cloud-based management servers (e.g., the cloud-based management server 1220) and battery-swapping fueling stations may enable use of batteries inserted into the battery-swapping fueling stations batteries distributed energy resources (DERs). Such use of the batteries may offer various benefits, such as allowing for the capability to sell energy back to the grid, facilitating smart transaction execution on electricity markets, etc.

An example swappable battery, in accordance with the present disclosure, for use in an end-to-end infrastructure for supporting use of electric vehicles, comprises a power delivery subsystem configured to deliver power to an electric vehicle when the swappable battery is coupled to the electric vehicle, and a power control circuit configure to control operation of the swappable battery. The swappable battery is configured for deployment in battery-swapping fueling stations in the end-to-end infrastructure, with each battery-swapping fueling station configured to swap swappable batteries into electric vehicles when they are refueling at the battery-swapping fueling station. The swappable battery is configured to, when swapped into the electric vehicle, connect to the electric vehicle via a battery interface, and the battery interface comprises one or more connections for facilitating interactions between the swappable battery and the electric vehicle during operation of the swappable battery in the electric vehicle.

In an example implementation, the one or more connections comprise at least one physical connector for use in delivery of power from the swappable battery.

In an example implementation, the one or more connections are configured via at least one communication connection, where the communication connection is set up via a wired connection, a wireless link, or an optical connection.

In an example implementation, the battery interface comprises at least one heating, ventilation, and air conditioning (HVAC) based connector configured for use in supporting or facilitating HVAC relating functions within the swappable battery.

In an example implementation, the power control circuit is configured to control operation of the swappable battery based on a predefined control state machine.

In an example implementation, the power control circuit is configured to operate in conjunction with a corresponding vehicle-side control unit, where the operation comprises at least coordinating delivery of power by the swappable battery.

In an example implementation, the swappable battery is configured for insertion into a corresponding battery housing in the electric vehicle.

In an example implementation, the swappable battery is configured for insertion into the battery housing as one of a plurality of swappable batteries.

In an example implementation, the swappable battery is configured to interact with at least one other swappable battery from the plurality of swappable batteries when the swappable battery is inserted into the battery housing, for supporting interactions with the electric vehicle during operation of the plurality of swappable batteries.

In an example implementation, the swappable battery is configured to interact with the at least one other swappable battery via one or both of: the battery interface, and one or more dedicated connectors and/or components configured for supporting inter-battery connectivity.

In an example implementation, the swappable battery further comprises a switching element configured for selective delivery of power into the electric vehicle.

An example electric vehicle, in accordance with the present disclosure, is configured for operation in an end-to-end infrastructure for supporting use of swappable batteries in electric vehicles, with the electric vehicle comprising a power distribution subsystem configured to receive power from a swappable battery when coupled to the electric vehicle, and a power control circuit configure to control operation of the swappable battery. The electric vehicle is configured for refueling in battery-swapping fueling stations in the end-to-end infrastructure, where each battery-swapping fueling station is configured to swap swappable batteries into electric vehicles when the electric vehicles are refueling at the battery-swapping fueling station. The electric vehicle is configured to, when the swappable battery is swapped into the electric vehicle, connect to the swappable battery via a battery interface, and the battery interface comprises one or more connections for facilitating interactions between the swappable battery and the electric vehicle during operation of the swappable battery in the electric vehicle.

In an example implementation, the one or more connections comprise least one physical connector for use in delivery of power from the swappable battery into the electric vehicle.

In an example implementation, the one or more connections are configured via at least one communication connection, where the communication connection is set up via a wired connection, a wireless link, or an optical connection.

In an example implementation, the battery interface comprises at least one heating, ventilation, and air conditioning (HVAC) based connector configured for use in supporting or facilitating HVAC relating functions within the swappable battery.

In an example implementation, the power control circuit is configured to control operation of the swappable battery based on a predefined control state machine.

In an example implementation, the power control circuit is configured to operate in conjunction with a corresponding battery-side control unit, where the operation comprises at least coordinating delivery of power by the swappable battery.

In an example implementation, the electric vehicle further comprises a switching element configured for enabling selective delivery of power into the electric vehicle.

In an example implementation, the electric vehicle further comprises a battery housing configured for receiving one or more swappable batteries, where the swappable battery is configured for insertion into the battery housing.

In an example implementation, the battery housing is configured for supporting deployment of multiple swappable batteries within the battery housing.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A swappable battery for use in an end-to-end infrastructure for supporting use of electric vehicles, the swappable battery comprising:
   a power delivery subsystem configured to deliver power to an electric vehicle when the swappable battery is coupled to the electric vehicle; and
   a power control circuit configure to control operation of the swappable battery;
   wherein:
      the swappable battery is configured for deployment in battery-swapping fueling stations in the end-to-end infrastructure, wherein each battery-swapping fueling station is configured for swapping swappable batteries into electric vehicles when the electric vehicles are refueling at the battery-swapping fueling station;
      the swappable battery is configured to, when deployed into the electric vehicle, connect to the electric vehicle via a battery interface; and
      the battery interface comprises one or more connections for facilitating interactions between the swappable battery and the electric vehicle during operation of the swappable battery in the electric vehicle, and wherein the one or more connections comprise at least one connection configured for use for purposes other than transfer or delivery of power.

2. The swappable battery of claim 1, wherein the one or more connections comprise least one physical connector for use in delivery of power from the swappable battery.

3. The swappable battery of claim 1, wherein the one or more connections are configured via at least one communication connection, the communication connection comprising a wired connection, a wireless connection, or an optical connection.

4. The swappable battery of claim 1, wherein the battery interface comprises at least one heating, ventilation, and air conditioning (HVAC) based connector configured for use in supporting or facilitating HVAC relating functions within the swappable battery.

5. The swappable battery of claim 1, wherein the power control circuit is configured to control operation of the swappable battery based on a predefined control state machine.

6. The swappable battery of claim 1, wherein the power control circuit is configured to operate in conjunction with a corresponding vehicle-side control unit, the operating comprising at least coordinating delivery of power by the swappable battery.

7. The swappable battery of claim 1, wherein the swappable battery is configured for insertion into a corresponding battery housing in the electric vehicle.

8. The swappable battery of claim 7, wherein the swappable battery is configured for insertion into the battery housing as one of a plurality of swappable batteries.

9. The swappable battery of claim 8, wherein the swappable battery is configured to interact with at least one other swappable battery from the plurality of swappable batteries when the swappable battery is inserted into battery housing, for supporting interactions with the electric vehicle during operation of the plurality of swappable batteries.

10. The swappable battery of claim 9, wherein the swappable battery is configured to interact with the at least one other swappable battery via one or both of: the battery interface, and one or more dedicated connectors and/or components configured for supporting inter-battery connectivity.

11. The swappable battery of claim 1, further comprising a switching element configured for selective delivery of power into the electric vehicle.

12. An electric vehicle configured for operation in an end-to-end infrastructure for supporting use of swappable batteries in electric vehicles, the electric vehicle comprising:
  a power distribution subsystem configured to receive power from a swappable battery when coupled to the electric vehicle; and
  a power control circuit configure to control use of the swappable battery when connected to the electric vehicle;

wherein:
  the electric vehicle is configured for refueling in battery-swapping fueling stations in the end-to-end infrastructure, wherein each battery-swapping fueling station is configured to swap swappable batteries into electric vehicles when refueling at the battery-swapping fueling station;
  the electric vehicle is configured to, when the swappable battery is deployed into the electric vehicle, connect to the swappable battery via a battery interface; and
  the battery interface comprises one or more connections for facilitating interactions between the swappable battery and the electric vehicle during operation of the swappable battery in the electric vehicle, and wherein the one or more connections comprise at least one connection configured for use for purposes other than transfer or delivery of power.

13. The electric vehicle of claim 12, wherein the one or more connections comprise least one physical connector for use in delivery of power from the swappable battery into the electric vehicle.

14. The electric vehicle of claim 12, wherein the one or more connections are configured via at least one communication connection, the communication connection comprising a wired connection, a wireless connection, or an optical connection.

15. The electric vehicle of claim 12, wherein the battery interface comprises at least one heating, ventilation, and air conditioning (HVAC) based connector configured for use in supporting or facilitating HVAC relating functions within the swappable battery.

16. The electric vehicle of claim 12, wherein the power control circuit is configured to control operation of the swappable battery based on a predefined control state machine.

17. The electric vehicle of claim 12, wherein the power control circuit is configured to operate in conjunction with a corresponding battery-side control unit, the operating comprising at least coordinating delivery of power by the swappable battery.

18. The electric vehicle of claim 12, further comprising a switching element configured for enabling selective delivery of power into the electric vehicle.

19. The electric vehicle of claim 12, further comprising a battery housing configured for receiving one or more swappable batteries, and wherein the swappable battery is configured for insertion into the battery housing.

20. The electric vehicle of claim 19, wherein the battery housing is configured for supporting deployment of multiple swappable batteries within the battery housing.

* * * * *